United States Patent
Horii et al.

(10) Patent No.: US 11,065,665 B2
(45) Date of Patent: Jul. 20, 2021

(54) PROGRESSIVE DIE MACHINE AND METHOD FOR MANUFACTURING LAMINATED IRON CORES BY USING SAME

(71) Applicant: KURODA PRECISION INDUSTRIES LTD., Kanagawa (JP)

(72) Inventors: Hideo Horii, Kanagawa (JP); Kenichi Shindo, Kanagawa (JP); Shinichi Sakanishi, Kanagawa (JP)

(73) Assignee: KURODA PRECISION INDUSTRIES LTD, Kawasaki (JP)

( * ) Notice: Subject to any disclaimer, the term of this patent is extended or adjusted under 35 U.S.C. 154(b) by 765 days.

(21) Appl. No.: 15/537,134

(22) PCT Filed: Dec. 17, 2015

(86) PCT No.: PCT/JP2015/006297
§ 371 (c)(1),
(2) Date: Jun. 16, 2017

(87) PCT Pub. No.: WO2016/098354
PCT Pub. Date: Jun. 23, 2016

(65) Prior Publication Data
US 2017/0361369 A1 Dec. 21, 2017

Related U.S. Application Data

(63) Continuation of application No. PCT/JP2015/006297, filed on Dec. 17, 2015.

(30) Foreign Application Priority Data

Dec. 18, 2014 (WO) .................. PCT/JP2014/006336

(51) Int. Cl.
*B21D 28/16* (2006.01)
*H02K 15/02* (2006.01)
(Continued)

(52) U.S. Cl.
CPC ............. *B21D 28/16* (2013.01); *B21D 28/02* (2013.01); *B21D 28/04* (2013.01); *B21D 28/10* (2013.01);
(Continued)

(58) Field of Classification Search
CPC ........ B21D 28/02; B21D 28/04; B21D 28/10; B21D 28/14; B21D 28/145; B21D 28/16;
(Continued)

(56) References Cited

U.S. PATENT DOCUMENTS 2,230,043 A * 1/1941 Moran ................. B21D 45/006
83/138
6,647,845 B1 * 11/2003 Ochi ...................... B26D 7/025
83/139
(Continued)

FOREIGN PATENT DOCUMENTS

JP      H 0344346 Y2    9/1991
JP      H11267770 A *  10/1996
(Continued)

OTHER PUBLICATIONS

International Search Report for PCT/JP2015/006297 dated Mar. 8, 2016, 4 pages.

*Primary Examiner* — Shelley M Self
*Assistant Examiner* — Katie L. Parr
(74) *Attorney, Agent, or Firm* — Dority & Manning, P.A.

(57) ABSTRACT

When provisionally blanking a lamination sheet by using a punch for provisional blanking and a counter punch, the displacement of pilot holes located around the lamination sheet is minimized. The progressive die machine (1) comprises a pilot hole punch (72), a punch (9) for provisionally punching an iron core laminate (2) from a strip (W) formed with pilot holes (P), a counter punch (31) provided in a lower die assembly (5) and configured to push the iron core
(Continued)

laminate (2) against the punch (9), a stripper plate (13) for separating the strip (W) from the provisional blanking punch after a provisional punching, a punch (10) for completely separating the iron core laminate from the strip. At least a part of the stripper plate (13) associated with the provisionally blanking is not in contact with the strip, and at least a part of an outer peripheral part of the provisionally blanked lamination sheet is formed with a connecting portion (79) connected to the strip.

11 Claims, 17 Drawing Sheets

(51) Int. Cl.
  *B21D 28/02*  (2006.01)
  *B21D 28/10*  (2006.01)
  *B21D 45/06*  (2006.01)
  *B21D 28/04*  (2006.01)
  *B21D 28/14*  (2006.01)

(52) U.S. Cl.
  CPC ............. B21D 45/06 (2013.01); H02K 15/02 (2013.01); *B21D 28/14* (2013.01)

(58) Field of Classification Search
  CPC .... B21D 28/22; B21D 35/001; B21D 35/003; B21D 35/005; B21D 45/003; B21D 45/006; B21D 45/02; B21D 45/04; B21D 45/06; B21D 45/08; H02K 15/02; Y10T 29/49012; Y10T 29/5197; H01F 41/0233

USPC ................................................. 72/404, 405.1
See application file for complete search history.

(56) References Cited

U.S. PATENT DOCUMENTS

| | | | | |
|---|---|---|---|---|
| 2005/0274243 | A1* | 12/2005 | Shiroza .................. | B21D 24/10 83/13 |
| 2010/0052463 | A1* | 3/2010 | Saito ...................... | B21D 28/22 310/216.001 |
| 2011/0132162 | A1* | 6/2011 | Grimm .................. | B21D 28/10 83/27 |
| 2013/0160622 | A1* | 6/2013 | Shigematsu ......... | H02K 15/024 83/23 |
| 2013/0186245 | A1* | 7/2013 | Onishi .................. | B21D 28/002 83/55 |
| 2013/0227999 | A1* | 9/2013 | Onishi .................... | B21D 28/16 72/19.9 |
| 2015/0121686 | A1* | 5/2015 | Shimizu ............... | H02K 15/022 29/598 |

FOREIGN PATENT DOCUMENTS

| | | |
|---|---|---|
| JP | H 11267770 | 10/1999 |
| JP | 2000051964 | 2/2000 |
| JP | 2004357349 | 12/2004 |
| JP | 2006122952 | 5/2006 |
| JP | 2013107111 | 6/2013 |
| JP | 2013226014 | 10/2013 |
| WO | WO 2005046992 | 5/2005 |

* cited by examiner

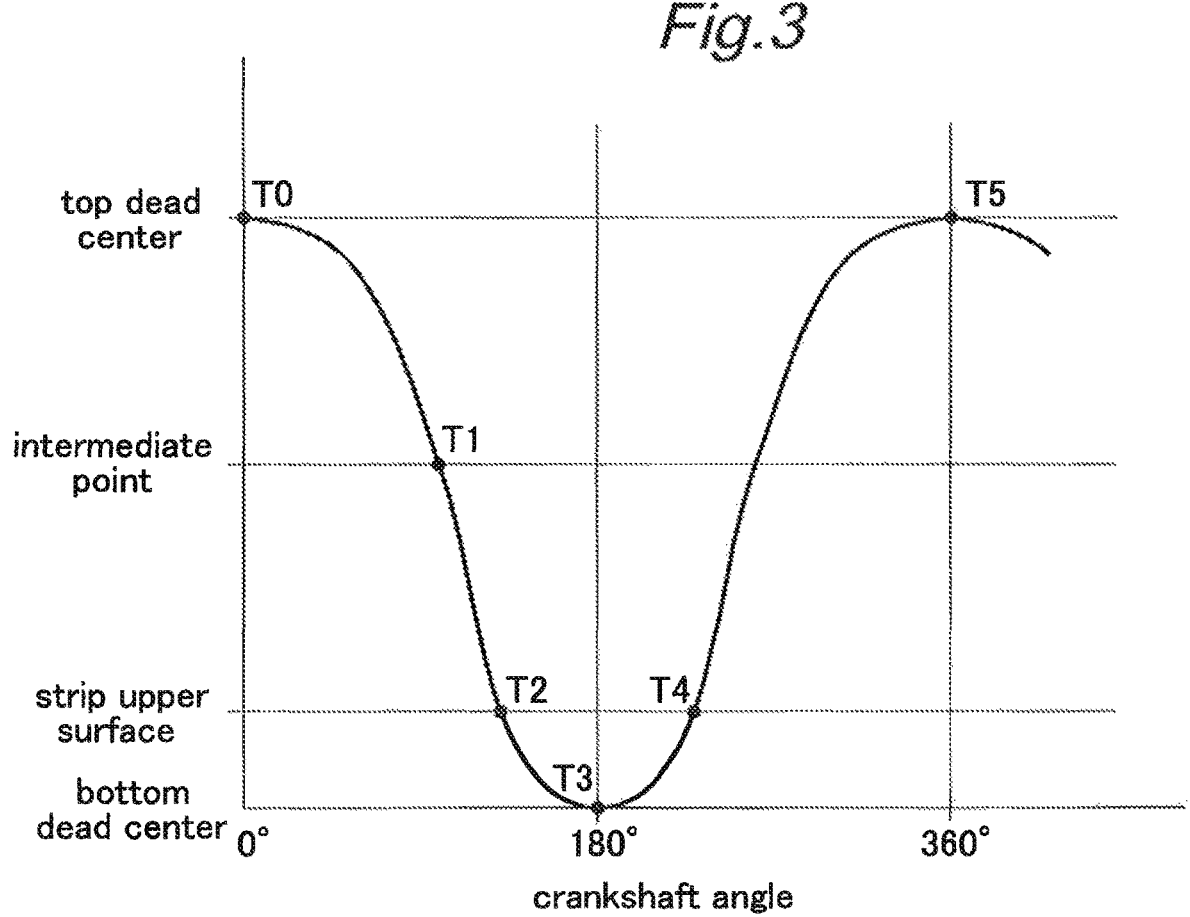

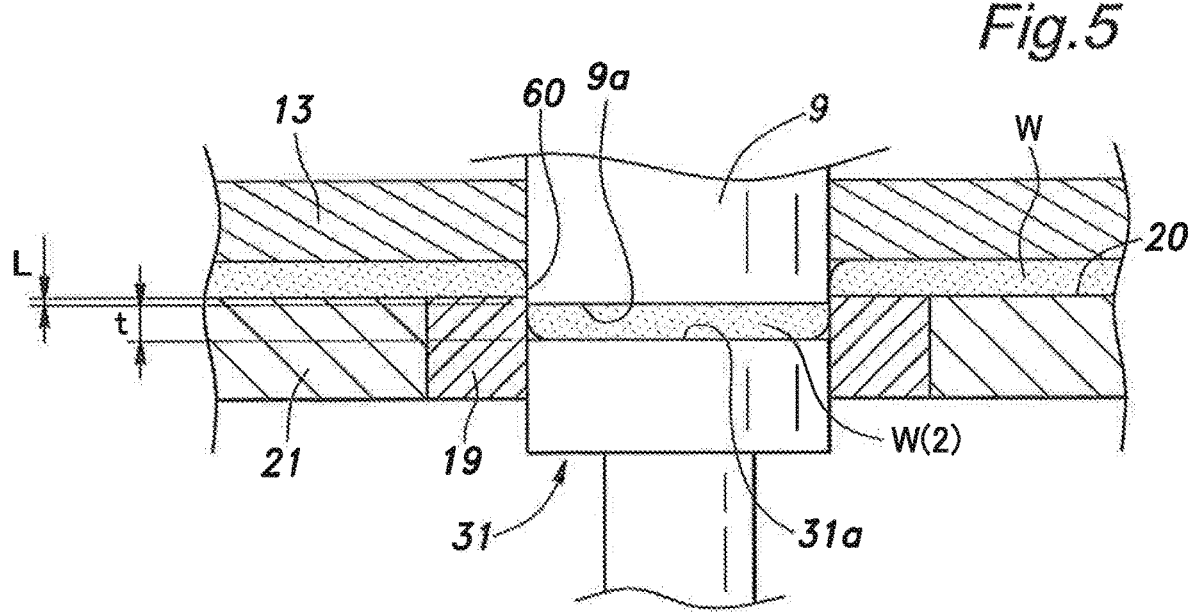

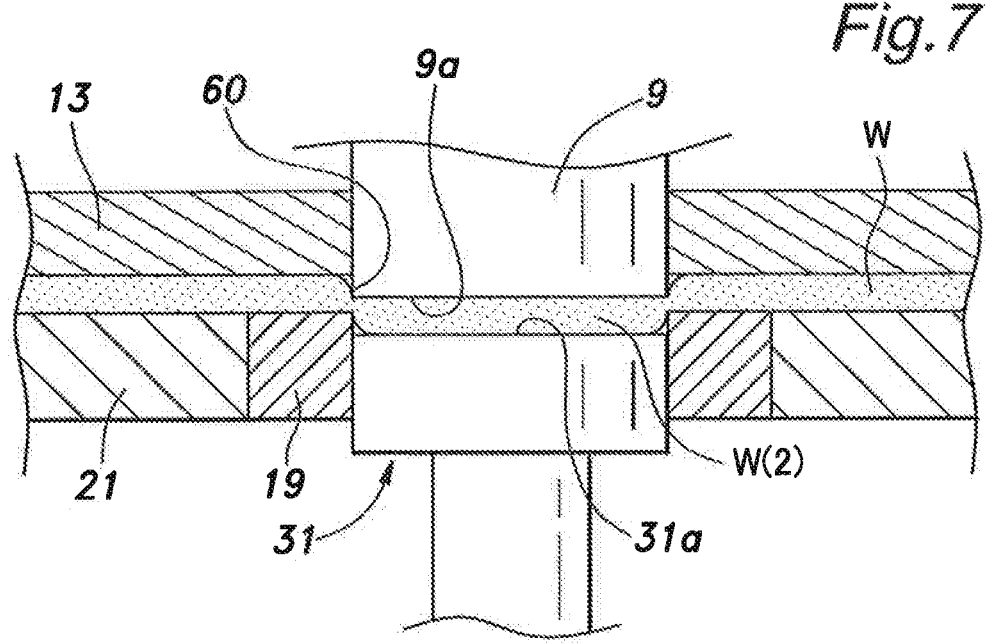

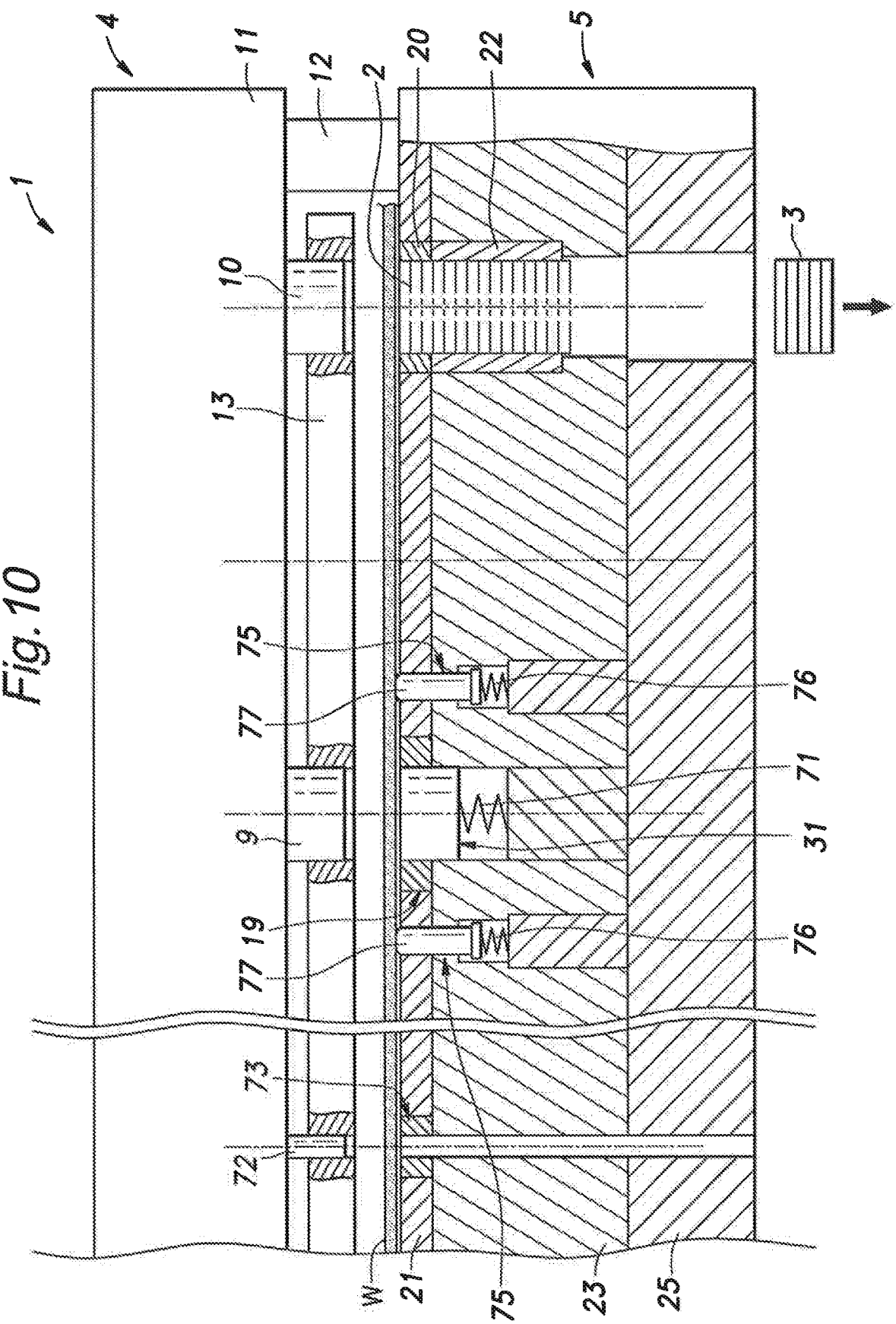

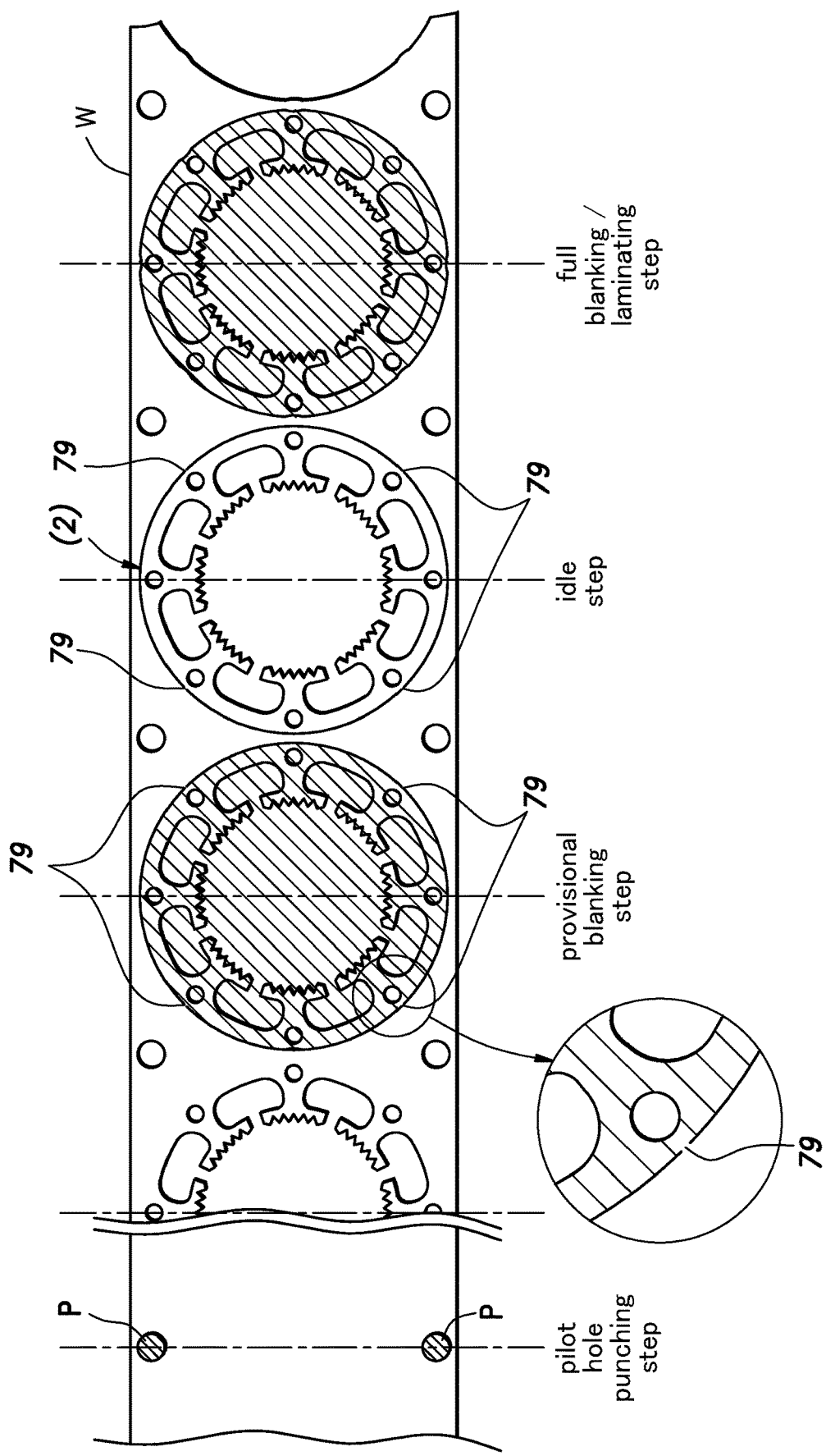

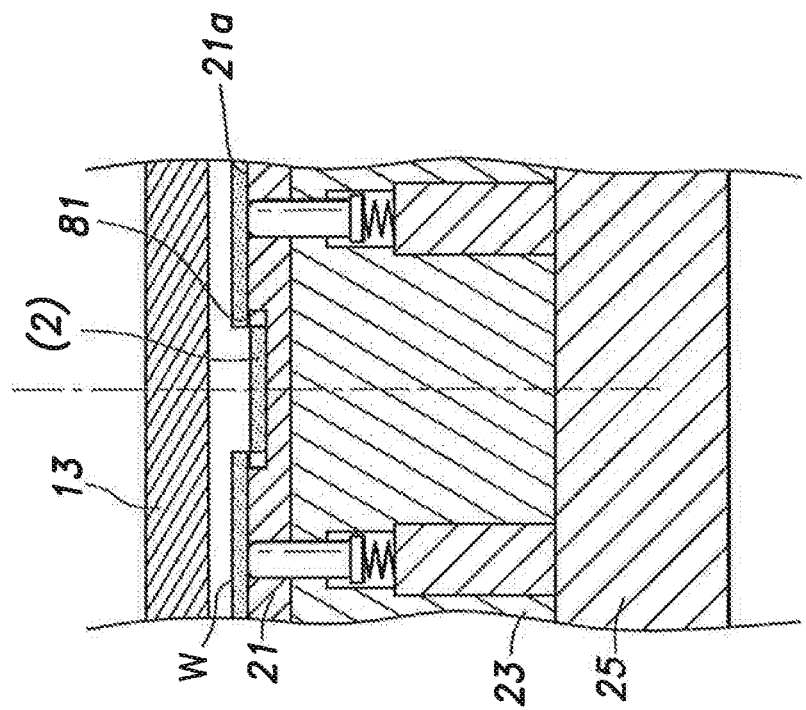
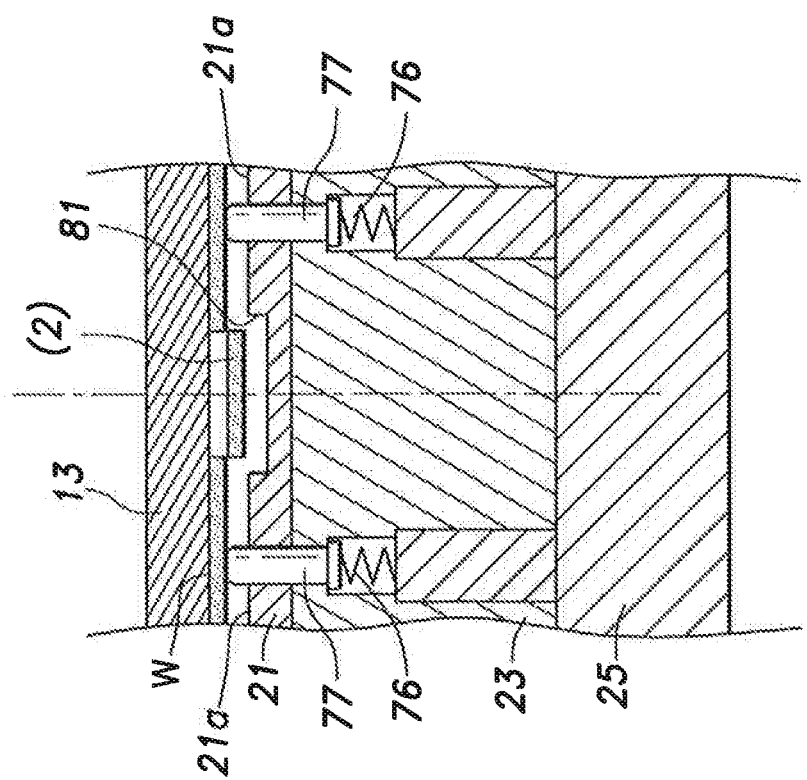
Fig. 13(A)
Fig. 13(B)

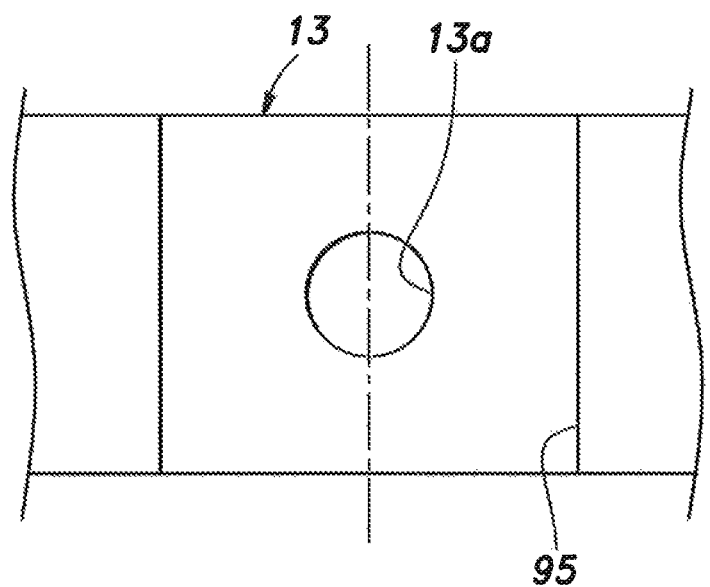

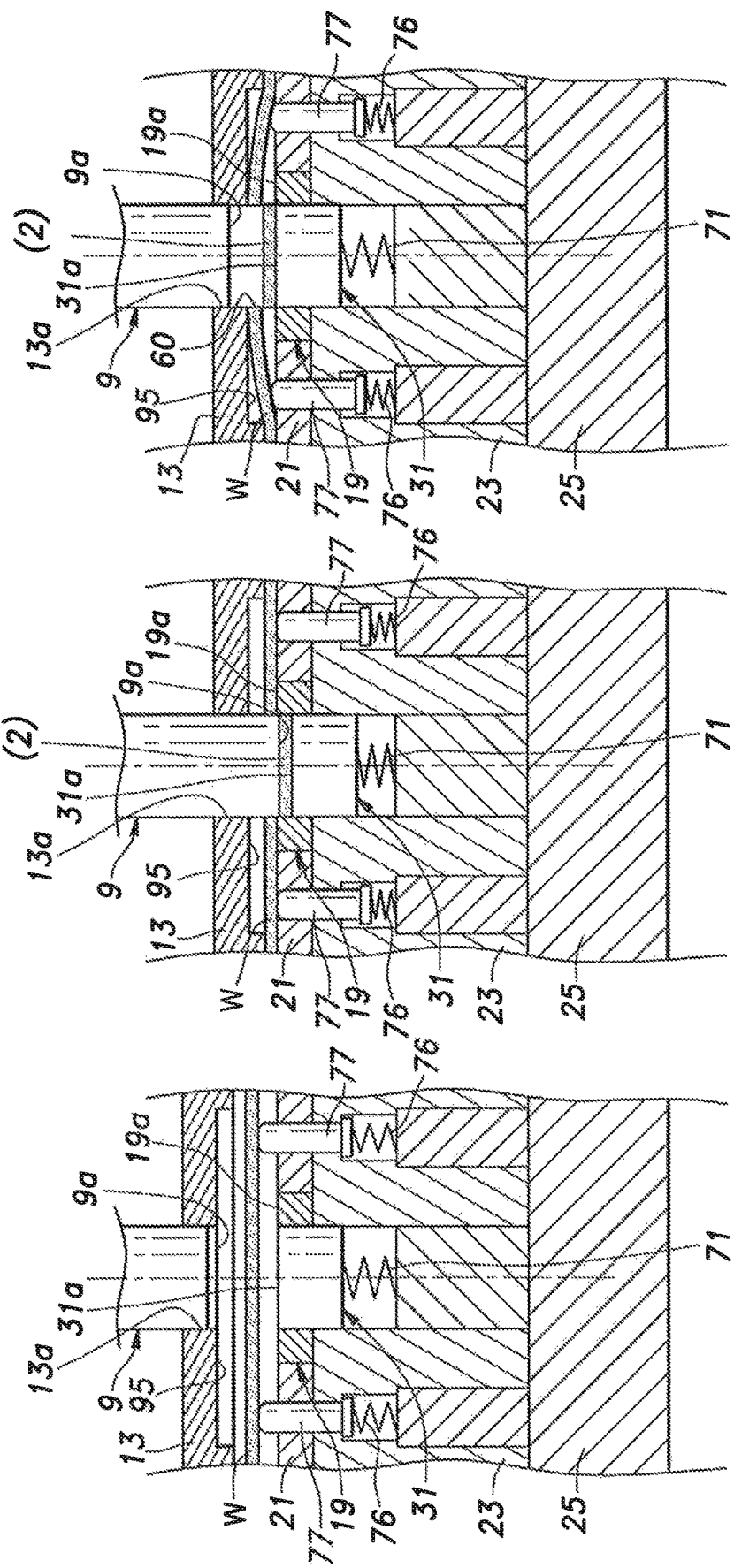

PROGRESSIVE DIE MACHINE AND METHOD FOR MANUFACTURING LAMINATED IRON CORES BY USING SAME

TECHNICAL FIELD

The present invention relates to a progressive die machine for blanking lamination sheets from a strip of sheet material that is being conveyed in an intermittent manner and a method for manufacturing iron cores by using such a progressive die machine.

BACKGROUND ART

When manufacturing laminated iron cores by using a conventional progressive die machine, a pushback operation may be performed for the purpose of minimizing the creation of burr when blanking iron core laminates for forming laminated iron cores. See Patent Document 1. In a pushback operation, the outer profile of each iron core laminate is provisionally blanked (either as a full blanking step or a half blanking step) from a strip of electromagnetic steel sheet, the blanked iron core laminate is pushed back into the corresponding opening of the strip (pushback), and the pushed back iron core laminate is finally blanked and separated from the strip in a subsequent step.

In the pushback operation, it is known that the planeness of the iron core laminate can be improved when provisionally blanking the iron core laminate with a punch by pressing the iron core laminate with an appropriate inverted pressing force which is directed in the opposite direction to the direction of the blanking operation by the punch. Such a pressure may be applied by using a counter punch which is urged by a spring toward the punch so that the iron core laminate may be clamped between the punch and the counter punch during the provisional blanking operation, and the resilient force of the spring (or the force for pushing back the iron core laminate) may be selected such that the provisionally blanked iron core laminate may be completely pushed back into the corresponding opening of the strip. See Patent Document 2.

PRIOR ART DOCUMENT(S)

Patent Document(s)

Patent Document 1: JP2004-357349A
Patent Document 2: JPH03-44346Y2

SUMMARY OF THE INVENTION

Task to be Accomplished by the Invention

However, in such a pushback operation, the outer diameter of the iron core laminate that is provisionally blanked may be greater than the outer diameter of the opening of the strip from which the iron core laminate is blanked owing to the creation of burr or the like. In such a case, if the iron core laminate is forcibly pushed back into the opening (is press fitted into the opening), the opening may be deformed to such an extent that pilot holes provided around the opening may be displaced, and the pitch of the pilot holes may be changed. To overcome this problem, the clearance between each pilot hole and the associated pilot pin may be increased, but this impairs the precision in the blanking operation of the iron core laminate.

In view of such a problem of the prior art, the inventors of this patent application have discovered that the opening can be prevented from deforming and the displacement of pilot holes and the deviation in the pitch of the pilot holes can be reduced or prevented by avoiding the provisionally blanked iron core laminate from being completely pushed back (or fitted into) the opening. This can be accomplished by (1) pushing back the fully blanked iron core laminate partly into the opening to such an extent that the iron core laminate may be retained in the opening in a stable manner; (2) by retaining the half blanked iron core laminate in the opening without pushing the iron core laminate back into the opening; or (3) retaining the fully blanked iron core laminate in the opening via a connecting portion formed between the outer periphery of the iron core laminate and the inner periphery of the opening without pushing back the iron core laminate into the opening.

The present invention was made in view of such a problem of the prior art, and has a primary object to provide a progressive die machine and a method for manufacturing laminated iron cores that, when provisionally blanking the iron core laminate by using a provisional blanking punch, can prevent the provisionally blanked iron core laminate from being completely separated or detached from the strip and can minimize the displacement of pilot holes located around the laminated iron core even when the iron core laminate is pressed by a counter punch in a direction opposite to the direction of the motion of the provisional blanking punch.

Means to Accomplish the Task

According to a first aspect of the present invention, a progressive die machine (1) including an upper die assembly (4) provided with a plurality of punches (9, 10, 72) for blanking lamination sheets (2) into a prescribed shape from a strip of sheet material (W) that is conveyed in an intermittent manner and a lower die assembly (5) provided with dies (19, 20, 73) for cooperating with the punches, the progressive die machine comprising: a pilot hole punch (72) for punching a pilot hole (P) in the strip for a positioning of the strip; a provisional blanking punch (9) for provisionally blanking each lamination sheet from the strip formed with the pilot hole without completely separating the lamination sheet from the strip; a counter punch (31) provided in the lower die assembly and configured to press the lamination sheet against the provisional blanking punch when provisionally blanking the lamination sheet; a stripper plate (13) for separating the strip from the provisional blanking punch after provisionally blanking the lamination sheet; and a full blanking punch (10) for completely separating the lamination sheet that has been provisionally blanked from the strip; wherein at least a part of the stripper plate associated with the provisional blanking is not in contact with the strip, and at least a part of an outer peripheral part of the provisionally blanked lamination sheet is formed with a connecting portion (79) connected to the strip.

In a progressive die machine based on the first aspect of the present invention, because a connecting portion connected to the strip is formed on the outer periphery of the lamination sheet, and at least a part of the stripper plate associated with the provisional blanking is not in contact with the strip, the provisionally blanked lamination sheet is prevented from being pushed back into the strip (the provisionally blanked lamination sheet is prevented from being pushed upward by the counter punch while the strip is pressed downward by the stripper plate). As a result, while the lamination sheet is prevented from being completely separated or detached from the strip (the lamination sheet is kept connected to the strip), the displacement of pilot holes located around the lamination sheet is minimized.

According to a second aspect of the present invention, in association with the first aspect of the present invention, the counter punch is normally biased toward a side of the provisional blanking punch.

In a progressive die machine based on the second aspect of the present invention, the drive unit for driving the counter punch may be realized by using a simple structure not requiring any power source such as a spring.

According to a third aspect of the present invention, in association with the first or second aspect of the present invention, the stripper plate is provided with a through hole (13a) receiving the provisional blanking punch for reciprocating movement therein, and a part of a surface of the stripper plate facing the die surrounding the through hole is formed with a recess (95).

In a progressive die machine based on the third aspect of the present invention, a part of the stripper plate associated with the provisional blanking is prevented from contacting the strip by using a simple structure. In this case, the stripper plate may be brought into contact with the strip (so that the stripper plate may press the strip against the die) in other stages (such as in a step for forming pilot holes) so that the precision of punching/blanking operations in other stages may be improved.

According to a fourth aspect of the present invention, in association with any one of the first to third aspects of the present invention, the progressive die machine further comprises an idle stage in a downstream part of the provisional blanking punch, wherein a surface of the lower die assembly facing the strip in the idle stage is formed with a recess (81) for receiving the provisionally blanked lamination sheet.

In a progressive die machine based on the fourth aspect of the present invention, in the idle stage located downstream of the punch for the provisional blanking, the provisionally blanked lamination sheet is received by the recess so that the lamination sheet is prevented from being pushed by the surface of the lower die assembly facing the strip, and being thereby pushed back into the strip.

According to a fifth aspect of the present invention, in association with any one of the first to fourth aspects of the present invention, the connecting portion is connected to the lamination sheet inside a notch (91) formed on an outer periphery of the lamination sheet.

In a progressive die machine based on the fifth aspect of the present invention, even when burr or shear drop is produced in the sheared edges of the connecting portion by the punch for the full blanking, the sheared edges are confined within the respective notches on the outer periphery of the lamination sheet so that the outer profile of the lamination sheet is prevented from being affected such burr or shear drop.

According to a sixth aspect of the present invention, a progressive die machine (1) including an upper die assembly (4) provided with a plurality of punches (9, 10, 72) for blanking lamination sheets (2) into a prescribed shape from a strip of sheet material (W) that is conveyed in an intermittent manner and a lower die assembly (5) provided with dies (19, 20, 73) for cooperating with the punches, the progressive die machine comprising: a pilot hole punch (72) for punching a pilot hole (P) in the strip for a positioning of the strip; a provisional blanking punch (9) for provisionally blanking each lamination sheet from the strip formed with the pilot hole without completely separating the lamination sheet from the strip; a counter punch (31) provided in the lower die assembly and configured to press the lamination sheet against the provisional blanking punch when provisionally blanking the lamination sheet; a drive unit (33) for vertically driving the counter punch; a control unit (34) for controlling an operation of the drive unit so as to vary a position of the counter punch and a pressure applied by the counter punch to the lamination sheet; a stripper plate (13) for separating the strip from the provisional blanking punch after provisionally blanking the lamination sheet; and a full blanking punch (10) for completely separating the lamination sheet that has been provisionally blanked from the strip; wherein the stripper plate is configured to press the strip against the die when each lamination sheet is provisionally blanked, and the control unit is configured to drive the counter punch upward with the drive unit while the stripper plate is displaced away from the strip after each lamination sheet is provisionally blanked.

In a progressive die machine based on the sixth aspect of the present invention, because a connecting portion connected to the strip is formed on the outer periphery of the lamination sheet, and at least a part of the stripper plate associated with the provisional blanking is not in contact with the strip, the provisionally blanked lamination sheet is prevented from being pushed back into the strip (the provisionally blanked lamination sheet is prevented from being pushed upward by the counter punch while the strip is pressed downward by the stripper plate). As a result, while the lamination sheet is prevented from being completely separated or detached from the strip (the lamination sheet is kept connected to the strip), the displacement of pilot holes located around the lamination sheet is minimized.

According to a seventh aspect of the present invention, a progressive die machine (1) including an upper die assembly (4) provided with a plurality of punches (9, 10, 72) for blanking lamination sheets (2) into a prescribed shape from a strip of sheet material (W) that is conveyed in an intermittent manner and a lower die assembly (5) provided with dies (19, 20, 73) for cooperating with the punches, the progressive die machine comprising: a pilot hole punch (72) for punching a pilot hole (P) in the strip for a positioning of the strip; a provisional blanking punch (9) for provisionally blanking each lamination sheet from the strip formed with the pilot hole without completely separating the lamination sheet from the strip; a counter punch (31) provided in the lower die assembly and configured to press the lamination sheet against the provisional blanking punch when provisionally blanking the lamination sheet; and a fill blanking punch (10) for completely separating the lamination sheet that has been provisionally blanked from the strip; wherein at least a part of an outer periphery of each lamination sheet is formed with a connecting portion (79) connected to the strip after being provisionally blanked, and the lamination sheet is conveyed to a subsequent step without being pushed back.

In a progressive die machine based on the seventh aspect of the present invention, the outer peripheral part of the lamination sheet is formed with the connecting portion connected to the strip, and the lamination sheet is conveyed to the subsequent step without being pushed back. As a result, while the lamination sheet is prevented from being completely separated or detached from the strip (the lamination sheet is kept connected to the strip), the displacement of pilot holes located around the lamination sheet is minimized.

According to an eighth aspect of the present invention, a method for manufacturing a laminated iron core by using a progressive die machine (1) including an upper die assembly (4) provided with a plurality of punches (9, 10, 72) for blanking lamination sheets (2) from a strip of sheet material (W) that is conveyed in an intermittent manner and a lower die assembly (5) provided with dies (19, 20, 73) for cooperating with the punches, the method comprising the steps of: punching a pilot hole (P) in the strip for a positioning of the strip; provisionally blanking each lamination sheet from the strip formed with the pilot hole without completely separating the lamination sheet from the strip; pressing the lamination sheet in a direction inverted from that for provisionally blanking the lamination sheet when provisionally blanking the lamination sheet; separating the strip from a punch for provisionally blanking the lamination sheet by using a stripper plate (13) after the lamination sheet is provisionally blanked and finally blanking the lamination sheet that has been provisionally blanked so as to completely separate the lamination sheet from the strip; wherein the strip is not pressed by the stripper plate against the die in the provisional blanking step, and at least a part of an outer periphery of each lamination sheet is formed with a connecting portion connected to the strip after being provisionally blanked.

In a method for manufacturing a laminated core based on the eighth aspect of the present invention, because the connecting portion connected to the strip is formed on the outer periphery of the lamination sheet, and at least a part of the stripper plate associated with the provisional blanking is not in contact with the strip, the provisionally blanked lamination sheet is prevented from being pushed back into the strip owing to the execution of the step of pressing the lamination sheet in the inverted direction. As a result, while the lamination sheet is prevented from being completely separated or detached from the strip (the lamination sheet is kept connected to the strip), the displacement of pilot holes located around the lamination sheet is minimized.

According to a ninth aspect of the present invention, a method for manufacturing a laminated iron core by using a progressive die machine (1) including an upper die assembly (4) provided with a plurality of punches (9, 10, 72) for blanking lamination sheets (2) from a strip of sheet material (W) that is conveyed in an intermittent manner and a lower die assembly (5) provided with dies (19, 20, 73) for cooperating with the punches, the method comprising the steps of: punching a pilot hole (P) in the strip for a positioning of the strip; provisionally blanking each lamination sheet from the strip formed with the pilot hole without completely separating the lamination sheet from the strip; pressing the lamination sheet in a direction inverted from that for provisionally blanking the lamination sheet by using a counter punch when provisionally blanking the lamination sheet; separating the strip from a punch for provisionally blanking the lamination sheet after the lamination sheet is provisionally blanked by using a stripper plate (13); and finally blanking the lamination sheet that has been provisionally blanked so as to completely separate the lamination sheet from the strip; wherein the strip is pressed by the stripper plate against the die when each lamination sheet is provisionally blanked, and the counter punch is moved upward while the stripper plate is displaced away from the strip after each lamination sheet is provisionally blanked.

In a method for manufacturing a laminated core based on the ninth aspect of the present invention, because the strip is pressed against the die by the stripper plate in the provisional blanking step, and the counter punch moves upward while the stripper plate is spaced from the lamination sheet following the provisional blanking step, the provisionally blanked lamination sheet is prevented from being pushed back into the strip. As a result, while the lamination sheet is prevented from being completely separated or detached from the strip (the lamination sheet is kept connected to the strip), the displacement of pilot holes located around the lamination sheet is minimized.

According to the present invention, when provisionally blanking the iron core laminate by using a provisional blanking punch, the provisionally blanked iron core laminate can be prevented from being completely separated or detached from the strip and the displacement of pilot holes located around the laminated iron core can be minimized even when the iron core laminate is pressed by a counter punch in a direction opposite to the direction of the motion of the provisional blanking punch.

BRIEF DESCRIPTION OF THE DRAWINGS

FIG. 3 is a chart illustrating the relationship between the position of the punch and the rotational angle of the crankshaft in the progressive die machine;

FIG. 5 is an enlarged view of a part of FIG. 4(C);

FIG. 7 is a view showing a mode of provisionally blanking the iron core laminate modified from that shown in FIG. 5;

FIG. 10 is a view showing a main part of a progressive die machine equipped with an inverted pressing device of a second embodiment of the present invention;

FIG. 11 is a view showing the strip layout of the progressive die machine of the second embodiment;

FIGS. 13(A) and 13(B) illustrate the mode of operation in a step following the provisional blanking step;

FIG. 16 is a bottom view of a stripper plate of the third embodiment; and

FIGS. 17(A) to 17(C) are views illustrating a series of actions in a provisional blanking step of the third embodiment.

DETAILED DESCRIPTION OF THE EMBODIMENTS

First Embodiment

Embodiments of the present invention are described in the following with reference to the appended drawings.

Figure 1:
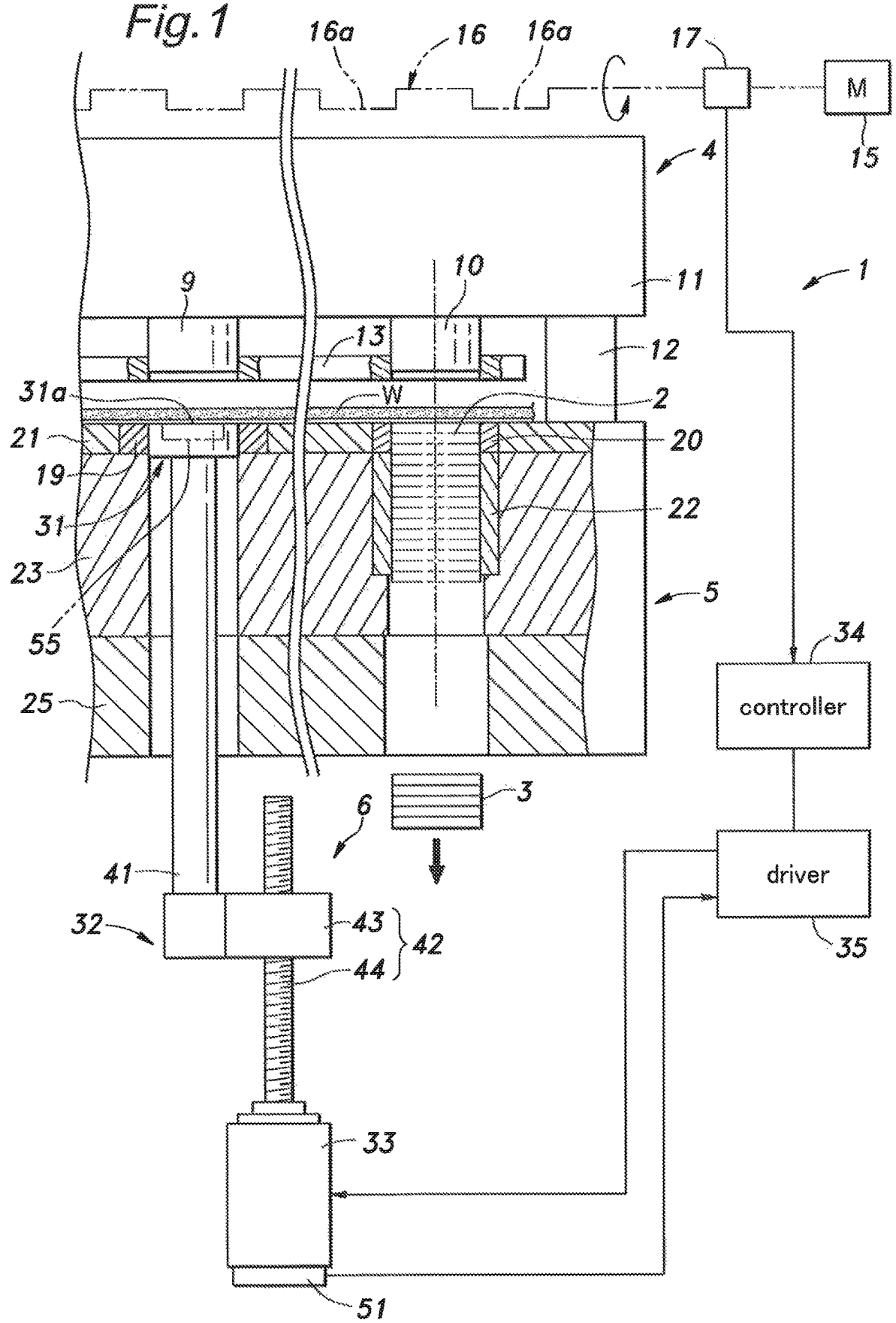
FIG. 1 is a view illustrating a main part of a progressive die machine provided with an inverted pressing device of a first embodiment.
Figure 2:
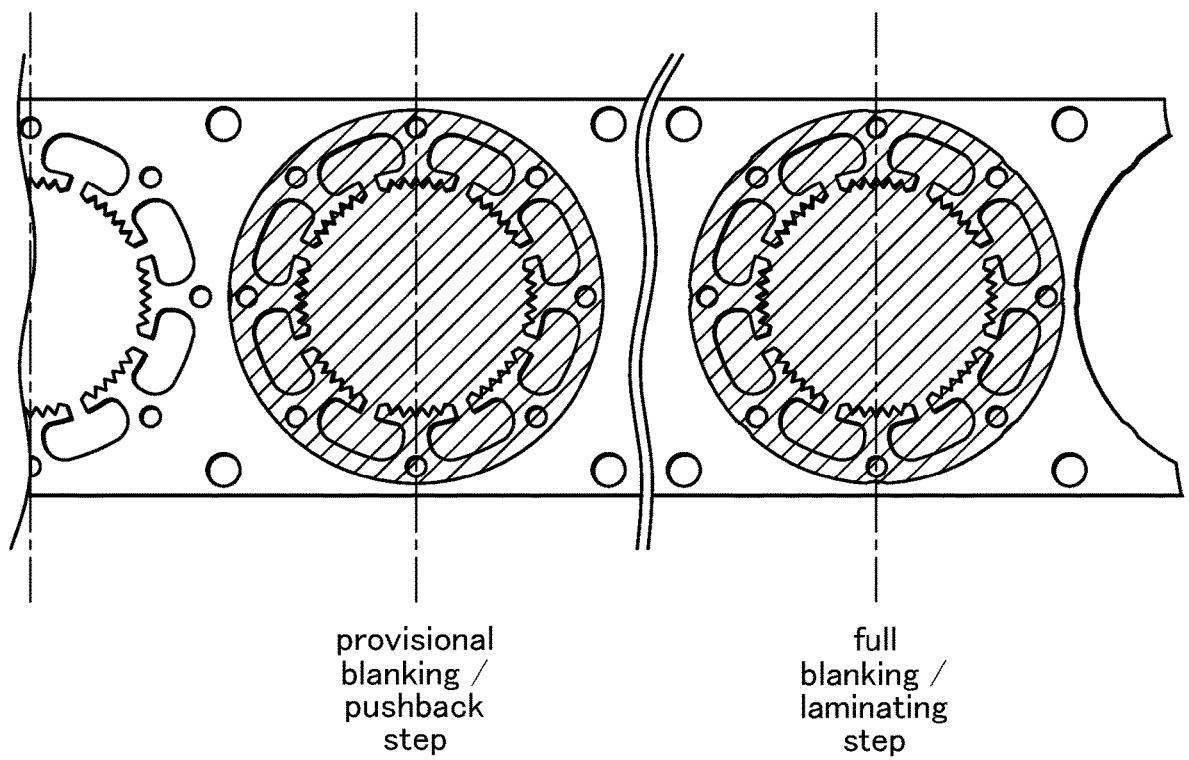
FIG. 2 is a diagram illustrating a strip layout of the progressive die machine.

FIG. 1 is a view illustrating a main part of a progressive die machine provided with an inverted pressing device of a first embodiment, and FIG. 2 is a diagram illustrating a strip layout of the progressive die machine.

The progressive die machine 1 is designed to manufacture laminated iron cores 3 by blanking iron core laminates 2 from a strip of electromagnetic iron sheet W and laminating the iron core laminates 2. The progressive die machine 1 includes an upper die assembly 4 configured to reciprocate in the vertical direction, a lower die assembly 5 fixedly secured to a holder not shown in the drawings, and an inverted pressing device 6 for applying an upward pressing force to the lower surface of the iron core laminate 2 when provisionally blanking (half blanking or full blanking) the iron core laminate 2.

The upper die assembly 4 includes a plurality of punches (only the punch 9 for provisional blanking and the punch 10 for the full blanking are shown in FIG. 1), a punch retainer 11 for retaining these punches, a plurality of guide posts (only one of the guide posts 12 is shown in FIG. 1) extending vertically for guiding the vertical reciprocating movement of the punch retainer 11, and a stripper plate 13 vertically moveably supported by a stripper guide not shown in the drawings for separating the blanked strip W from the punches 9 and 10.

An upper part of the upper die assembly 4 is fixedly connected to a slide unit (not shown in the drawings) for causing the upper die assembly 4 to reciprocate vertically (by a stroke of 25 mm to 35 mm, for instance). The slide unit converts the rotational movement of a crankshaft 16 driven by an upper die assembly drive motor 15 to the vertical movement of the upper die assembly 4 via connecting rods (not shown in the drawings). The slide unit is provided with an encoder 17 for detecting the rotational phase of the crankshaft 16 (the angular position of the crankshaft 16 with respect to a reference angular position), and producing a corresponding encoder signal (synchronization signal).

The lower die assembly 5 includes dies 19 and 20 formed with circular blanking holes for receiving the corresponding cylindrical punches 9 and 10, a die plate 21 retaining the outer peripheries of the dies 19 and 20, a squeeze ring 22 for applying a side pressure (squeezing force) to the laminated iron core laminates 2, a die holder 23 for retaining the squeeze ring 22 and supporting the lower surface of the die plate 21, and a sub plate 25 supporting the lower surface of the die holder 23.

The punch 9 and the associated die 18 are used for a provisional blanking/pushback step (see FIG. 2) where the outer profile of the iron core laminate 2 is provisionally blanked and pushed back while an inverted pressing force is applied to the strip W. The punch 10 and the associated die 20 for a full blanking step are used for a full blanking/laminating step (see FIG. 2) where the iron core laminate 2 is finally blanked after which was pushed back previously, and is laminated on the preceding iron core laminate 2.

The inner diameter of the squeeze ring 22 is substantially equal to (equal to, slightly greater than or slightly smaller than) the inner diameter of the die 20 so that the iron core laminates 2 blanked by the punch 10 and deposited in the die 20 are forced downward in a sequential manner while receiving a prescribed side pressure.

The outer profile of each iron core laminate 2 is substantially circular in the illustrated embodiment, but may also be of a different configuration (such as rectangular, fan-shaped, trapezoidal, E-shaped, I-shaped and T-shaped configurations, for instance). The inverted pressing device 6 can be used not only for blanking the iron core laminate 2, but also for punching any part of the iron core laminate 2.

In the progressive die machine 1, the lamination crimping method is used for securing the iron core laminates 2 to one another so that each laminated iron core 3 is formed by crimping the recess and the projection formed in the adjoining iron core laminates 2 together. However, in the progressive die machine 1 of the present invention, a bonding method using an adhesive agent, a laser welding method using laser energy, or any other per se known method may be used for fixedly joining the iron core laminates 2 to one another.

The inverted pressing device 6 is configured to provide an inverted pressing force when provisionally blanking the iron core laminates 2 by using the punch 9 and the die 19 and pushing back the iron core laminates 2 following the provisional blanking, and includes a counter punch 31 serving as an inverted pressing member configured to push each iron core laminate 2 against the punch 9 located above, a support unit 32 for supporting the counter punch 31 from below, a vertical drive motor 33 for producing the power required for moving the counter punch 31 in the upward and downward directions via the support unit 32, a controller 34 for controlling the operation of the vertical drive motor 33, and a driver 35 for driving the vertical drive motor 33 as commanded by the controller 34. The vertical drive motor 33 may consist of a per se known electric motor such as a servo motor and a stepping motor.

The counter punch 31 has a substantially same outer diameter as the outer diameter of the punch 9. The counter punch 31 is provided with a substantially circular upper surface 31a, and is configured to apply a pressure to the iron core laminate 2 to be provisionally blanked by moving upward with the upper surface 31a of the counter punch 31 kept in contact with the lower surface of the iron core laminate 2. Owing to the reciprocating movement of the support unit 32, the counter punch 31 is moveable between an upper limit position where the upper surface 31a is (substantially) flush with the upper end surface of the die 19 and a lower limit position where the upper surface 31a is displaced downward by a prescribed distance from the upper limit position. The configuration and size of the upper surface 31a of the counter punch 31 can be selected freely depending on the shape of the contact surface between the iron core laminate 2 and the counter punch 31.

The support unit 32 is provided with a vertically extending support shaft 41 and a ball screw 42 consisting of a nut 43 and a screw rod 44. The support shaft 41 is provided with a high stiffness, and is prevented from moving in the horizontal direction by a guide not shown in the drawings. The upper end of the support shaft 41 is connected to a lower end part of the counter punch 31, and the lower end of the support shaft 41 is fixedly attached to the nut 43. Although not shown in the drawings, the nut 43 is internally provided with a screw thread defining a spiral passage accommodating rolling balls in cooperation with the screw thread of the screw rod 44, and a recirculation passage and a deflector for recirculating the balls in a per se known manner. The screw rod 44 is directly connected to the output shaft of the vertical drive motor 33 in a coaxial relationship.

Owing to this arrangement, in the support unit 32, as the vertical drive motor 33 rotates in the normal direction so as to cause the screw rod 44 to rotate in the normal direction, the nut 43 moves upward, and the support shaft 41 (along with the counter punch 31) also moves upward. Conversely, as the vertical drive motor 33 rotates in the reverse direction so as to cause the screw rod 44 to rotate in the reverse direction, the nut 43 moves downward, and the support shaft 41 (along with the counter punch 31) also moves downward.

The screw rod 44 is rotated by the vertical drive motor 33 in this embodiment, but alternatively, the nut may be rotated by the vertical drive motor 33. In such a case, the counter punch vertically reciprocates with the screw rod owing to the rotation of the nut threaded with the screw rod.

The vertical drive motor 33 is provided with an encoder 51 for detecting the rotational speed and the rotational angle thereof. The detection result of the encoder 51 is forwarded to a driver 35 as an encoder signal (speed/position detection signal). The rotational speed and the rotational angle of the vertical drive motor 33 can be detected not only with such an encoder but also with other detection devices such as a resolver. Alternatively, other speed/position detection devices such as a linear scale may be used for detecting the position of the nut, and the detection result of the device may be forwarded to the driver 35 as a speed/position detection signal.

The controller 34 receives a synchronizing signal including information on the rotational phase of the crankshaft 16 (or the timing of the upward and downward movements of the punch 10) from the encoder 17 on the side of the upper die assembly 4, and based on this synchronizing signal, controls the rotation of the vertical drive motor 33 (or the reciprocating movement of the counter punch 31) by forwarding a position command, a speed command and a torque command to the driver 35. Based on at least one of the position command, the speed command and the torque command from the controller 34, and the speed/position detection signal (speed/position feedback signal) from the encoder 51, the driver 35 controls the limit positions (stop positions), the rotational speed and the torque (or the position, the reciprocating speed and the pressure of the counter punch 31) by controlling the electric current supplied by a power source (not shown in the drawings) to the vertical drive motor 33.

As will be described hereinafter, in the progressive die machine 1, a prescribed pressure (clamping force) is applied to the iron core laminate 2 by clamping the iron core laminate 2 between the punch 9 and the counter punch 31 when provisionally blanking the iron core laminate 2 in the provisional blanking/pushback step. Following the blanking of the iron core laminate 2, by applying a pressure to the iron core laminate 2 with the counter punch 31, the iron core laminate 2 is incompletely pushed back to the associated opening (not shown in the drawings) of the strip W. Thus, the contents of the position command, the speed command and the torque command may be selected so as to apply a suitable pressure (clamping force) to the iron core laminate 2 at the time of blanking with the punch 9 and the die 19, and apply a suitable pressure to the iron core laminate 2 that is to be pushed back following the blanking of the iron core laminate 2.

When provisionally punching the iron core laminate 2 with the punch 9, a downward force is applied by the punch 9 to the counter punch 31 which is in contact with the iron core laminate 2. Because a ball screw 42 is configured to be reversible, when a relatively large load (exceeding a prescribed torque limit value), the vertical drive motor 33 is rotated in the reverse direction. Therefore, the inverted pressing device 6 is not only able to apply a relatively large load to the iron core laminate 2 with the vertical drive motor 33 but also is able to provide a cushioning effect to the impact caused by the punch 9, similarly as a spring in a more conventional arrangement, by the reversal of the movement of the ball screw 42 (or the downward movement of the counter punch 31) so that the load on the support unit 32 and the associated parts can be reduced (or the punching load is mitigated). The specific structure of the inverted pressing device 6 is not limited to that used in the illustrated embodiment, but may be constructed in different ways as long as the ball screw is configured for the reverse movement. The cushioning action of the ball screw 42 with respect to the impacts of the punch can be obtained without regard to the mode of performing the push back operation.

In the full blanking/laminating step, the iron core laminates 2 blanked by the punch 10 are deposited in the die 20, and are sequentially pushed into the squeeze ring 22 provided under the die 20 as the iron core laminates 2 are stacked in the die 20. The iron core laminates 2 are fixedly attached to one another for each prescribed number of iron core laminates 2 so as to form the respective laminated iron cores 3.

Although now shown in the strip layout illustrated in FIG. 2, in the step for the iron core laminates 2, the iron core laminates 2 are sequentially subjected to the various punching steps for pilot holes, slots, internal teeth and so on by performing a pilot hole punching step, a slot punching step, an internal teeth punching step and so on. In the progressive die machine 1, by taking into account the interval between the punches 9 and 10 (or the interval between the dies 19 and 20), an idle step where no punching operation is performed may be provided between the provisional blanking/pushback step and the full blanking/laminating step. The configurations of various parts of the iron core laminate 2 may be freely modified without departing from the spirit of the present invention as long as a suitable pressure may be applied to the iron core laminate 2 by the inverted pressing device 6.

Figure 4C:
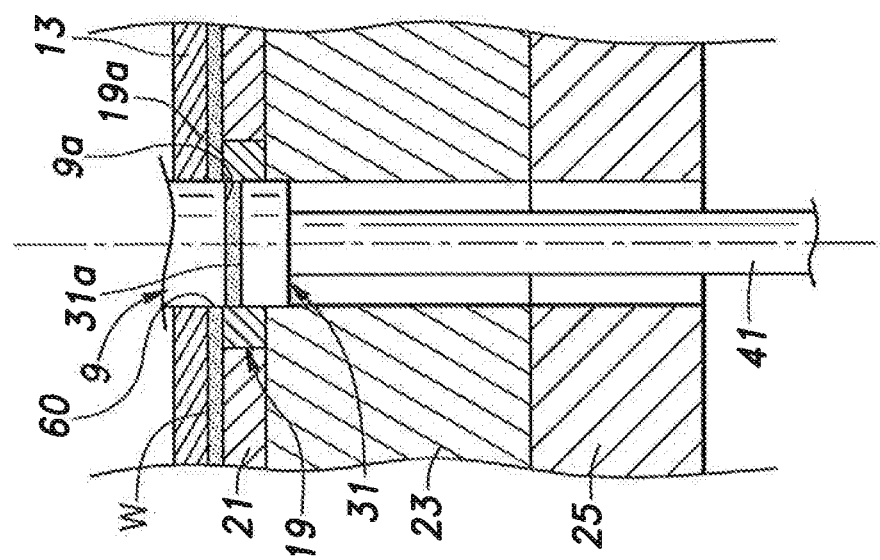
FIGS. 4(A) to 4(C) are views illustrating a series of actions up to a provisional blanking operation in a provisional blanking/pushback step.
Figure 4B:
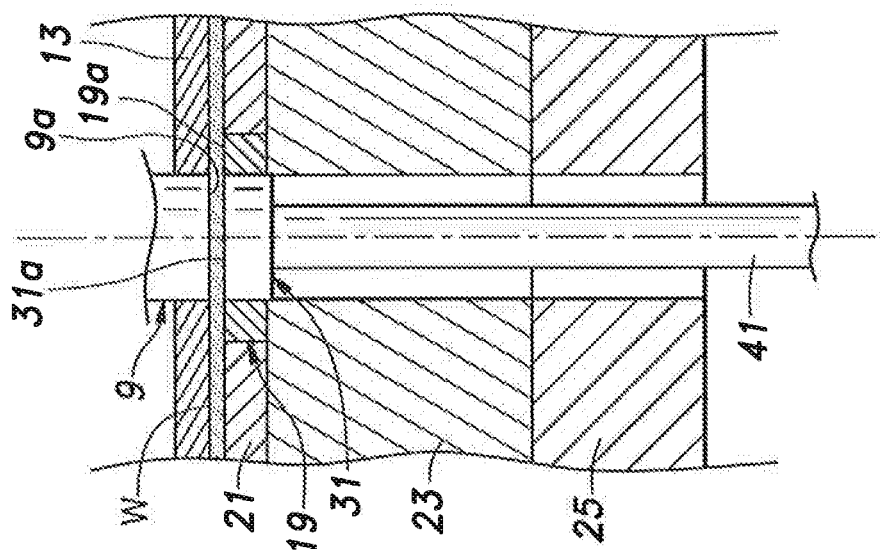
Figure 4A:
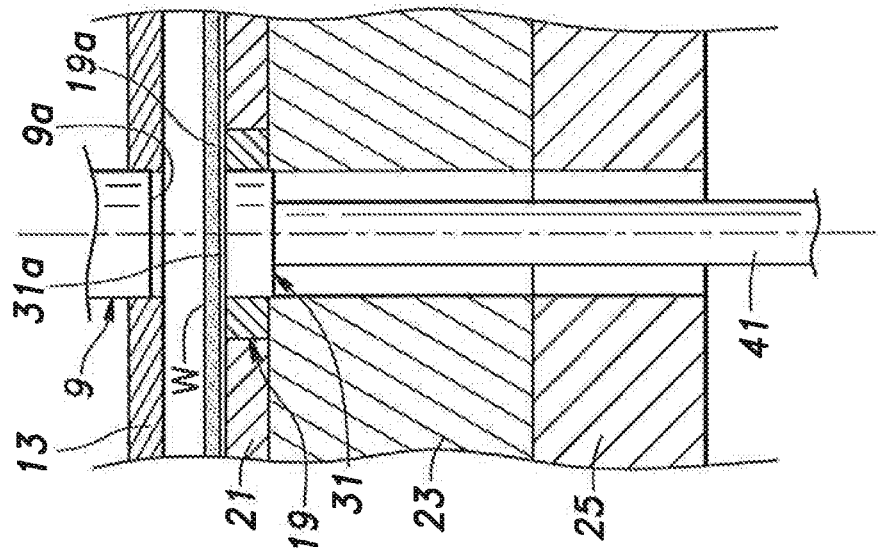

FIG. 3 is a chart showing the relationship between the position of the punch and the rotational angle of the crankshaft in the progressive die machine. FIGS. 4(A) to 4(C) are views illustrating a series of actions up to the provisional blanking operation in the provisional blanking/pushback step, FIG. 5 is an enlarged view of a part of FIG. 4(C), and FIGS. 6(A) to 6(C) are diagrams illustrating a series of actions following the provisional blanking operation in the provisional blanking/pushback step.

In FIG. 3, the ordinate indicates the position of a free end 9a of the punch 9 that moves vertically in dependence on the vertical position of the crankpin 16a of the crankshaft 16 (see FIG. 1), and the abscissa indicates the rotational angle of the crankshaft 16. Letters T1 to T5 in FIG. 3 indicate the time point (elapsed time) at the respective points. As shown in FIG. 3, during each cycle of reciprocating movement, the punch 9 starts from the top dead center at time T0 (crankshaft angle of zero degrees) to the bottom dead center at time T3 (crankshaft angle of 180 degrees), and back to the top dead center at time T5. Time T2 corresponds to the time point at which the free end 9a of the punch 9 has descended to the position of the surface of the strip W, and time T4 corresponds to the time point at which the free end 9a of the punch 9 has ascended to the position of the surface of the strip W once again.

The blanking operation of the strip W by the punch 9 is performed during the time interval between T2 and T4 where the punch 9 touches the strip W and returns to the original position. However, the punching of the iron core laminate 2 into the die 19 is substantially completed during the time interval between T2 and T3 where the punch 9 touches the strip W and passes the top dead center.

In the illustrated embodiment, the synchronization signal from the encoder 27 includes a first synchronization signal which is sequentially produced from the encoder 17 at the timing immediately preceding the starting of the punching operation of the iron core laminate (time T0 or T5 in FIG. 3), and a second synchronization signal which is sequentially produced from the encoder 17 at the time preceding the bottom dead center (time T3 in FIG. 3) by a prescribed time period Tz.

The mode of operation in the provisional blanking/pushback step in the progressive die machine 1 is described in the following with reference to FIG. 4. FIG. 4(A) shows the state of the punch preceding the downward movement of the punch 9, and the free end 9a of the punch 9 is at the initial position or the upper limit position (corresponding to the top dead center at T0 in FIG. 3). Similarly, the stripper plate 13 is also at the upper limit position. The upper surface 31a of the counter punch 31 is also at the initial position (first position) which is at the same height as the upper end surface 19a of the die 19.

In FIG. 4(B), the punch 9 moves downward from the upper limit position shown in FIG. 4(A) and contacts the upper surface of the strip W, and the free end 9a of the punch 9 is located slightly above the lower limit position (corresponding to the bottom dead center at T3 in FIG. 3). The stripper plate 13 moves downward along with the punch 9, and presses the strip W downward against the die 19 and the die plate 21. The upper surface 31a of the counter punch 31 is located at the same position as in FIG. 4(A) so that the strip W (the iron core laminate 2) is clamped between the upper surface 31a of the counter punch 31 and the punch 9.

FIG. 4(C) shows the state where the strip W is provisionally blanked by the punch 9, and the free end 9a of the punch 9 is at the lower limit position (corresponding to the bottom dead center at T3 in FIG. 3). The counter punch 31 moves downward from the position shown in FIG. 4(B) because the ball screw 42 is reversed under the pressure of the punch 9. At this time, as shown in FIG. 5, the upper surface 31a of the counter punch 31 moves to a lower position (blanked position) which is displaced downward from the upper end surface 19a of the die 19 by a distance (L+t) given as a sum of a penetration depth (L) of the punch 9 into the die 19 at the lower limit position and the thickness (t) of the iron core laminate 2. A force (a first upward force) is applied to the downwardly moving counter punch 31 so as to return the counter punch 31 to the first position.

The mode of operation of the progressive die machine 1 following the provisional blanking during the provisional blanking/pushback step is described in the following with reference to FIG. 6. The operation shown in FIG. 6 is performed in succession to the operation shown in FIG. 4.

Figure 6A:
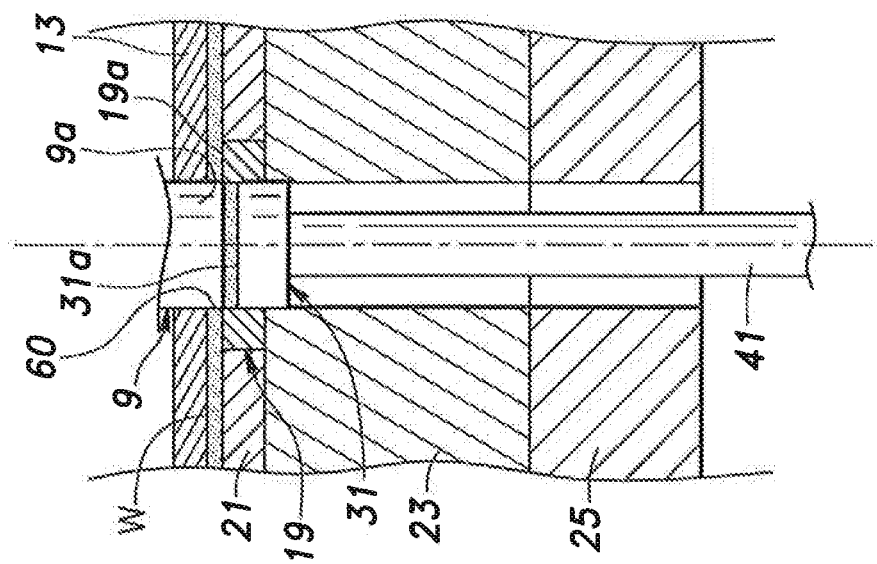
FIGS. 6(A) to 6(C) are views illustrating a series of actions following the provisional blanking operation in the provisional blanking/pushback step.

FIG. 6(A) shows the state of the punch 9 when the punch 9 has started moving upward from the state shown in FIG. 4(C) following the blanking of the iron core laminate 2. At this time, the stripper plate 13 still continues to press the strip W downward against the die 19 and the die plate 21. While the strip W is pressed by the stripper plate 13, the counter punch 31 follows the upward movement of the punch 9 by receiving an upward force (a second upward force) so that the iron core laminate 2 receives an upward force from the counter punch 31. As a result, a pushback operation for pushing the iron core laminate 2 into the blanked opening 60 is started.

Figure 6B:
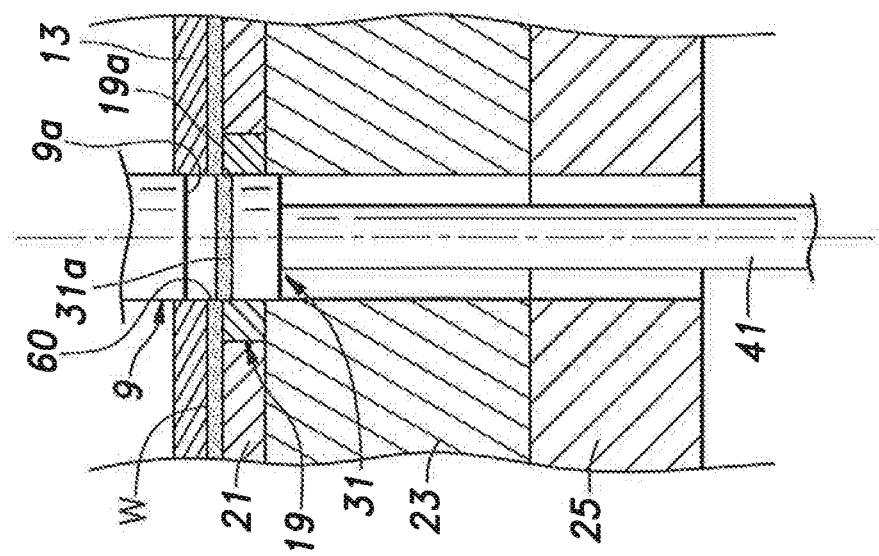

FIG. 6(B) shows the counter punch 31 being pushed upward to a prescribed position while the strip W is pressed by the stripper plate 13. As a result, the iron core laminate 2 is pushed back into the blanked opening 60 incompletely. In this incomplete pushback operation, the iron core laminate 2 is not completely fitted into the blanked opening 60, and only a part of the iron core laminate 2 (upper peripheral part) is fitted into the blanked opening 60. Thereafter, the punch 9 continues to move upward to the upper limit position, and the stripper plate 13 also moves upward to the upper limit position thereof with a certain time delay with respect to the upward movement of the punch 9.

Figure 6C:
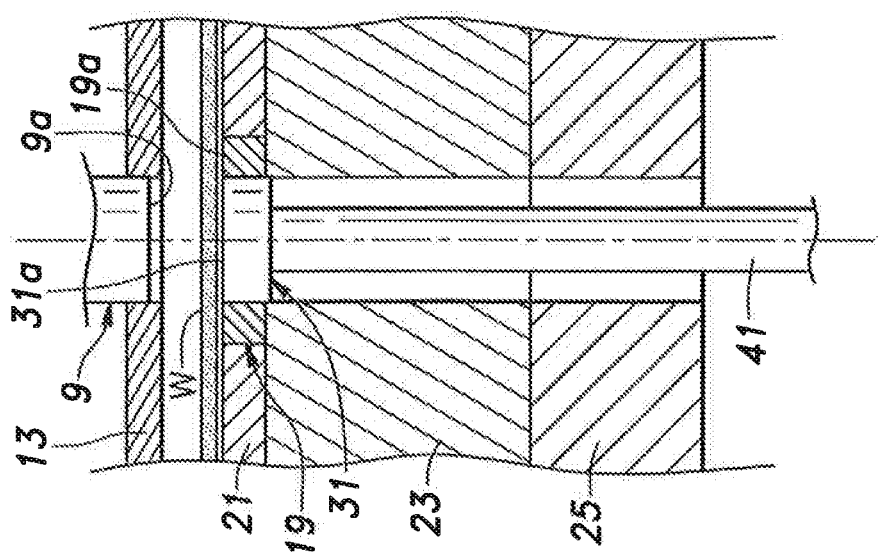

In FIG. 6(C), the strip W is conveyed (the iron core laminate 2 which was pushed back in FIG. 6(B) is conveyed rightward to the subsequent step), and the punch 9 and the stripper plate 13 move upward to the initial position similarly as in FIG. 4(A). Thereafter, the series of actions discussed above are repeated. In FIGS. 4 to 6, the thickness of the iron core laminate 2 is exaggerated for the convenience of description. In reality, even in the state shown in FIG. 6(B), the distance by which the iron core laminate 2 which has been pushed back projects from the strip W is so small that the conveying of the strip W is not affected (or is not obstructed by the die 19). Following the upward movement of the stripper plate 13, the strip W is lifted by a lifter (not shown in the drawings) provided in a part of the upper surface of the lower die assembly 5 adjoining the die 19 so that the conveying of the strip W is not obstructed even when the iron core laminate 2 projects slightly downward from the strip W.

It is also possible to perform a provisional blanking step which does not involve the pushback of the fully blanked iron core laminate 2 into the blanked opening 60 as shown in FIG. 5, instead of the provisional blanking/pushback step, as is the case with a second embodiment and a third embodiment which will be described hereinafter. In such a case, after the stripper plate 13 is raised from the state shown in FIG. 6(A) (or while the stripper plate 13 is spaced from the strip W), the counter punch 31 may be moved upward (to the initial position). Also, in the situation illustrated in FIG. 4(C), the iron core laminate 2 may be provisionally blanked with the punch 9 such that a connecting portion connecting the outer peripheral part of the iron core laminate 2 with the strip W (the inner periphery of the blanked opening 60). The connecting portion may consist of a plurality connecting pieces arranged along the outer periphery of the iron core laminate 2 at a prescribed interval so that the provisionally blanked iron core laminate 2 may be suspended from the strip W via the connecting pieces. The connecting pieces are removed by the punch 10 in the subsequent full blanking/laminating step, and the iron core laminate 2 is blanked into the die 20 similarly as discussed earlier.

FIG. 7 is a view showing a mode of provisionally blanking the iron core laminate 2 modified from that shown in FIG. 5. In the example discussed above, the iron core laminate 2 was fully blanked so that the iron core laminate 2 was separated from the strip W. However, it is also possible to half blank the iron core laminate 2 so that the iron core laminate 2 is not fully separated from the strip W. In such a case, the operation corresponding to that shown in FIG. 6(B) causes the iron core laminate 2 to be slightly pushed back into the blanked opening 60 from the half blanked state. The distance by which the iron core laminate is pushed back from the half blanked state may be selected freely as long as the iron core laminate 2 is not completely pushed back into the blanked opening 60. For instance, it is possible to push the iron core laminate 2 which has been half blanked by the punch 9 beyond the blanked opening 60 with the upward movement of the counter punch 31. In this case, the iron core laminate 2 which has been pushed up may protrude upward from the upper surface of the strip W so that only a lower part of the outer periphery of the iron core laminate 2 is fitted into the blanked opening 60.

It is also possible to perform a provisional blanking step without involving the operation of pushing back the half blanked iron core laminate 2 into the opening 60, as opposed to the provisional blanking/push back step shown in FIG. 7. In this case, in conjunction with FIG. 6(B) which was referred to earlier, the iron core laminate 2 may be pushed out of the die 19 without being pushed back into the opening 60 by raising the counter punch 31 to a prescribed position following the start of the upward movement of the stripper plate 13 (or while the stripper plate 13 is displaced away from the strip W after the iron core laminate 2 is provisionally blanked). In other words, by appropriately controlling the start of the upward movement the counter punch 31 in relation to the upward movement of the stripper plate 13, the pushback may be either avoided or performed as desired.

Figure 8:
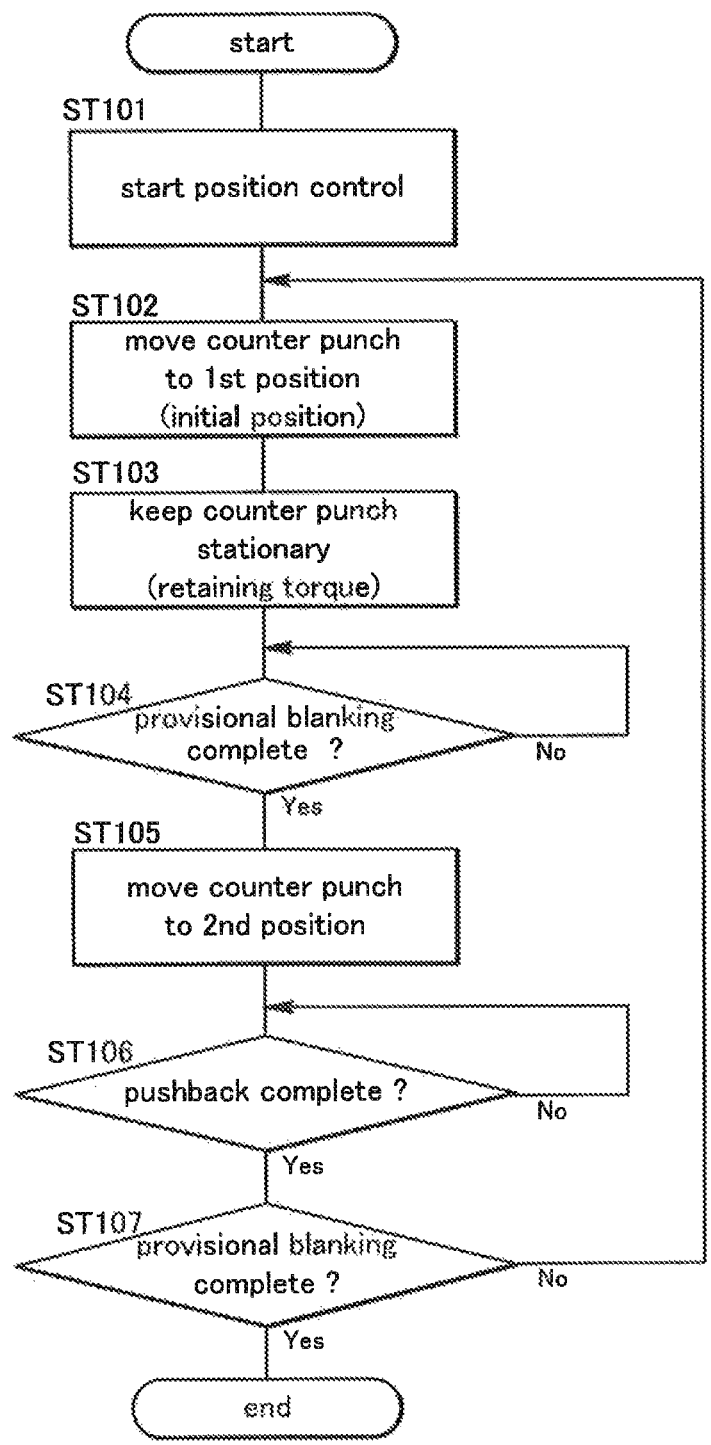
FIG. 8 is a flowchart showing the mode of operation of an inverted pressing device of the first embodiment.

FIG. 8 is a flowchart showing the mode of operation of the inverted pressing device. Upon activation of the inverted pressing device 6, the controller 34 starts a position control by forwarding a position command for the vertical drive motor 33 to the driver (step ST101), and this causes the counter punch 31 to be moved to a first position (initial position) (step ST102). The first position of the counter punch 31 corresponds to the position shown in FIG. 4(A) (where the upper surface 31a is at the same elevation as the upper end surface 19a of the die 19) in the illustrated embodiment, but may also be defined as a position where the upper surface 31a is at a different elevation from that of the upper end surface 19a of the die 19.

The driver 35 causes the vertical drive motor 33 to produce a retaining torque that is required to retain the counter punch 31 at the initial position so that the counter punch 31 is held stationary (step ST103). At this time, the driver 35 acquires a torque command for setting the upper limit value (first upper limit value) of the retaining torque, and determines a current limit value (or a torque limit value) applied to the vertical drive motor 33. Alternatively, the driver 35 may determine the current value (or torque output) that is to be supplied to the vertical drive motor 33 according to a torque target value set in advance by a torque command from the controller 34. The value of the retaining torque may vary depending on the parameters of the operation for blanking the iron core laminate 2, but may be determined with the aim of improving the planeness of the iron core laminate 2 (or minimizing the warping of the iron core laminate 2) by using an appropriate clamping force for the iron core laminate 2 between the punch 9 and the counter punch 31 during the operation of provisional blanking.

Once the provisional blanking of the iron core laminate 2 by the punch 9 is started, the controller 34 determines if the provisional blanking by the punch 9 has been completed (step ST104). If the provisional blanking has been completed (Yes), the controller 34 forwards a position command for the vertical drive motor 33 to the driver 35 to move (raise) the counter punch 31 to a second position which is lower than the first position (step ST105). The completion of the provisional blanking is determined by the controller 34 in a number of different ways. For instance, the time point at which the controller 34 receives the second synchronization signal (which is generated ahead of the expected time point of the bottom dead center of the punch 9 (see time point T3 in FIG. 2) by the prescribed time period) (or upon elapsing of a certain time period from this time point) may be determined as the time point of completing the provisional blanking. Alternatively, the completion of the provisional blanking may be determined upon elapsing of a certain time period after the controller 34 has received the first synchronization signal (indicating the start of the blanking operation) from the encoder 17. In regard to step ST105, if the counter punch 31 pushes up the iron core laminate 2 by being moved upward beyond the opening 60, the second position will be higher than the first position.

The distance between the first position and the second position substantially corresponds to the stroke by which the iron core laminate 2 is pushed back into the opening 60 in the strip W (or the depth by which the iron core laminate 2 is pushed into the opening 60). The second position may vary depending on the blanking condition, but may be selected so as not to completely fit the iron core laminate 2 into the opening 60 of the strip W when pushing back the iron core laminate 2 following the provisional blanking of the iron core laminate 2 (or so as to prevent the deformation of the opening 60 and associated parts by only partly pushing the iron core laminate 2 back into the opening 60).

The position control of step ST105 is continued until the completion of the pushback operation is determined by the controller 34 (ST106: Yes). Upon determination of the completion of the pushback operation (ST106: Yes), the controller 34 repeats the foregoing steps ST102 to ST106 until it is determined that the blanking of all the iron core laminates 2 has been completed (Yes). The determination of the completion of the pushback operation in step T106 may be performed in a number of different ways. For instance, it can be determined from the magnitude of the load current of the vertical drive motor 33 detected by the controller 34. Alternatively, a force sensor 55 (see FIG. 1) may be provided in an upper part of the counter punch 31 to determine the completion of the pushback operation from the detection result of the force sensor 55. It is also possible to determine the completion of the pushback operation from the angular position of the upper die assembly.

The provisional blanking by the punch 9 was started after the counter punch 31 has moved to the first position (or when the counter punch 31 has become stationary) in the foregoing embodiment, but may also be started while the counter punch 31 is moving upward. In this case, instead of steps ST101 to ST104, the counter punch 31 initially at the lower limit position may be moved upward at a prescribed speed by speed controlling the vertical drive motor 33 after receiving the first synchronization signal so that the counter punch 31 may reach the first position or a position adjacent to the first position before the punch 9 reaches the position (at which the punch 9 comes into contact with the upper surface of the strip W) shown in FIG. 4(B).

Figure 9:
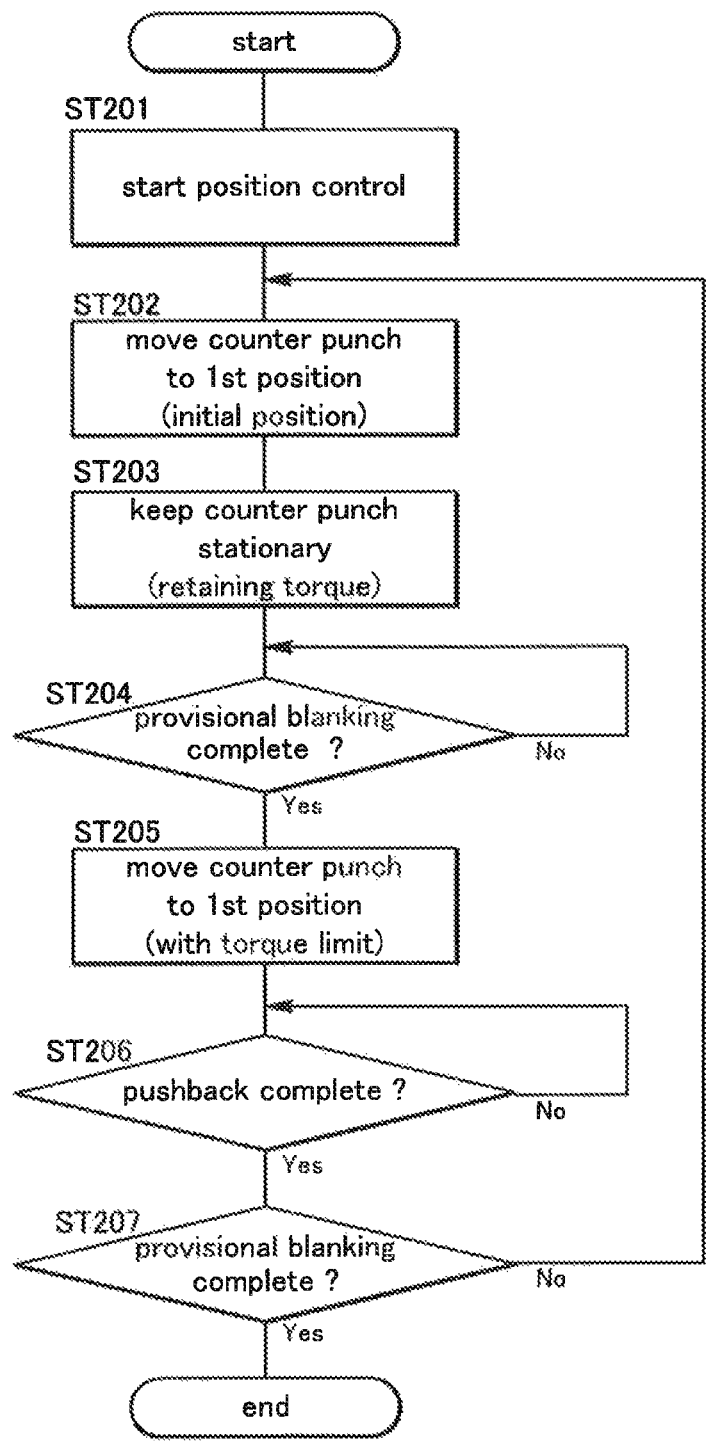
FIG. 9 is a flowchart showing the mode of operation of the inverted pressing device modified from that shown in FIG. 8.

FIG. 9 is a flowchart of the mode of operation of the inverted pressing device modified from that shown in FIG. 8. In the modified embodiment shown in FIG. 9, steps ST201 to ST204, ST206 and ST207 similar to steps ST101 to ST104, ST106 and ST107 shown in FIG. 8 are executed, but the operation of the counter punch 31 (ST205) following the completion of the provisional blanking differs from that of step ST105 shown in FIG. 8.

More specifically, when the completion of the provisional blanking by the punch 9 is determined (ST204: Yes), the counter punch 31 is moved upward to the initial position (the first position) once again by forwarding the position command to the driver 35. At this time, the driver 35 acquires the torque command for determining the upper limit value (second upper limit value) of the vertical drive motor 33 from the controller 34, and based on this torque command, determines the current limit value (or the torque value) that is to be applied to the vertical drive motor 33. The upper limit value of the torque may vary depending on the blanking condition, but may be selected so as not to completely fit the iron core laminate 2 into the opening 60 of the strip W when pushing back the iron core laminate 2 similarly as in step ST105 shown in FIG. 8. The upper limit value is at least lower than the upper limit value of the retaining torque mentioned above. In the modified embodiment, the pushback is completed (ST206: Yes) before the counter punch 31 has moved to the first position. The stroke by which the iron core laminate 2 is pushed back into the opening 60 of the strip W is determined in dependence on the upper limit value of the torque of the vertical drive motor 33.

In this manner, in the inverted pressing device 6 of the progressive die machine 1 discussed above, by providing the vertical drive motor 33 for vertically driving the counter punch 31, the controller 34 that can adjust the position of the counter punch 31 and the pressure applied by the counter punch 31 to the iron core laminate 2, and the associated driver 35, the force of clamping the iron core laminate 2 with the punch 9 and the counter punch 31 can be increased so that the planeness of the iron core laminate 2 can be improved, and troubles associated with the deformation of the opening 60 in the strip W that could be caused by partly fitting the iron core laminate 2 into the opening 60 following the provisional blanking (at the time of pushing back) can be avoided.

Second Embodiment

FIG. 10 is a view showing a main part of the progressive die machine equipped with an inverted pressing device of a second embodiment of the present invention, and FIG. 11 is a diagram showing the strip layout of the progressive die machine. In FIGS. 10 and 11, the parts corresponding to those shown in FIGS. 1 and 2 (the first embodiment) are denoted with like numerals. The second embodiment is similar to the first embodiment except for the matters that will be discussed in the following.

As shown in FIG. 10, the second embodiment differs from the first embodiment using the vertical drive motor 33 in that the counter punch 31 of the inverted pressing device 6 is supported by a spring 71 (consisting of a dish spring in this case). As will be discussed hereinafter, the downward movement of the stripper plate 13 is limited in the second embodiment so that the stripper plate 13 does not contact the strip W (or is spaced upward from upper surface of the strip W) when the strip W is blanked by the punches 9 and 10.

Although not shown in FIG. 1 (the first embodiment), a punch 72 (punch for a pilot hole) provided in the upper die assembly 4 is shown in FIG. 10. The punch 72 forms a pilot hole P (see FIG. 11) for positioning the strip W in the progressive die machine 1 in cooperation with a die 73 provided in the lower die assembly 5. FIG. 10 also shows a pair of lifters 75 provided in the lower die assembly 5 adjacent to the die 19 (one each on the upstream side and the downstream side of the die 19 with respect to the conveying movement of the strip W). Each lifter 75 is provided with a lifter pin 77 which is normally urged toward (upward) the strip W by a spring 76. The lifter pin 77 is retractable into the die plate 21 so that the upper end of the lifter pin 77 contacts the lower surface of the strip W, and normally pushes the strip W in the upward direction. FIG. 10 shows only two such lifters 75, but a larger number of lifters 75 are provided along the conveying direction of the strip W.

FIG. 11 shows a pilot hole punching step for forming a pilot hole P in the strip W while this step is omitted from illustrated in FIG. 2 (the first embodiment). The second embodiment includes a provisional blanking step, instead of the provisional blanking/pushback step of the first embodiment (in other words, the pushback operation is not performed). The outer periphery of the iron core laminate 2 that has been blanked in the provisional blanking step is formed with a plurality (four, in this case) of connecting pieces (connecting portion) 79 connected to the strip W (or to the inner periphery of the opening from which the iron core laminate 2 is blanked). As shown in FIG. 11, an idle step (an idle stage) where no punching/blanking operation is performed is provided between the provisional blanking step and the full blanking/laminating step. Such an idle step may be provided as required, but may be omitted depending on the situation.

Figure 12A:
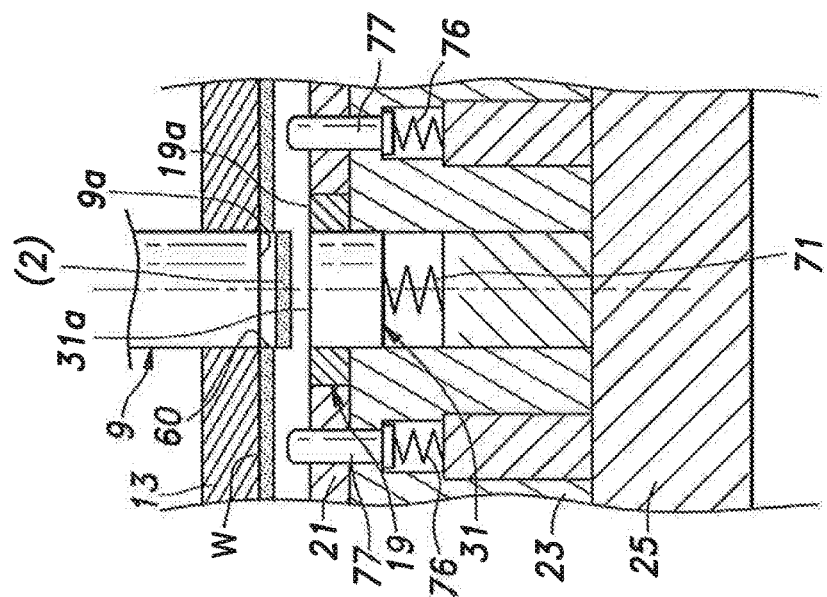
FIGS. 12(A) to 12(C) are views illustrating a series of actions in a provisional blanking step.
Figure 12B:
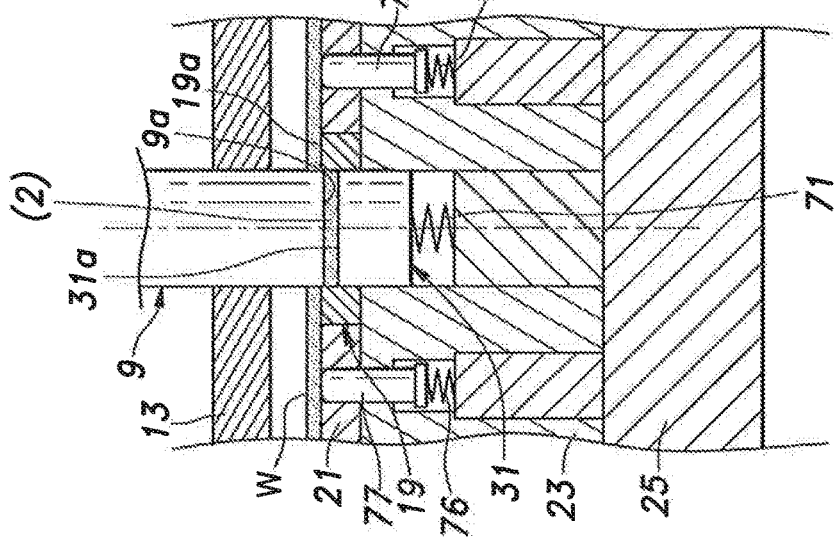
Figure 12C:
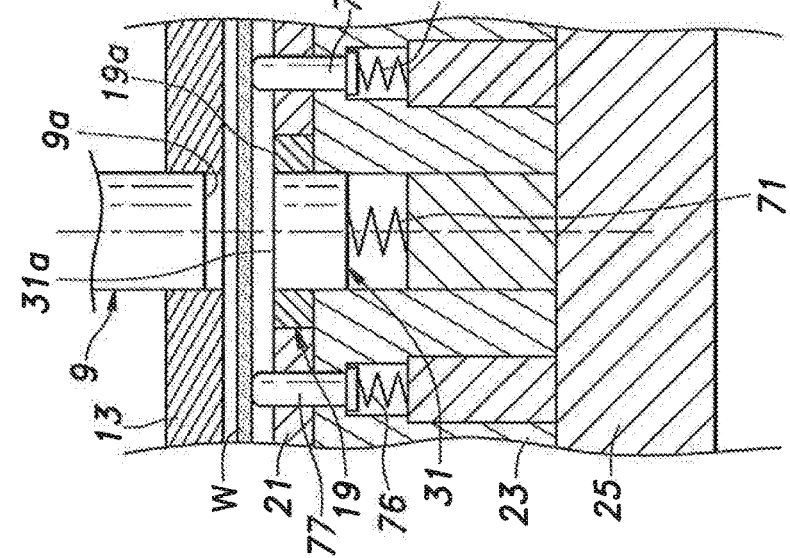

FIGS. 12(A) to 12(C) show a series of actions in the provisional blanking step. FIG. 12(A) shows the punch 9 immediately before the vertical movement thereof so that the free end 9a of the punch 9 is at the upper limit position. The upper surface 31a of the counter punch 31 is at the same elevation (or about the same elevation) as the upper end surface 19a of the die 19. In the second embodiment, the stripper plate 13 is held at a fixed position without regard to the vertical movement of the punch 9.

FIG. 12(B) shows the provisional blanking of the strip W by the punch 9 similarly as in FIG. 4(C), and the free end 9a of the punch 9 is at the lower limit position. The counter punch 31 moves downward from the position shown in FIG. 12(A) as the pressure of the punch 9 compresses the spring 71. Similarly, the lifter pins 77 retract (move downward) into the lower die assembly 5 (the die plate 21) as the springs 76 compress under the pressure of the punch 9 transmitted via the strip W.

At this time, the upper surface 31a of the counter punch 31 moves downward to a lower position (blanked position) which is lower than the upper end surface 19a of the die 19 by a distance (L+t) given as a sum of the penetration depth (L) (fitting length) of the punch 9 into the die 19 at the lower limit position and the thickness (t) of the iron core laminate 2 similarly as in the case shown in FIG. 5. In this case, the iron core laminate 2 is not completely separated from the strip W because a plurality of connecting pieces 79 connected to the strip W are formed along the outer periphery of the iron core laminate 2 as shown in FIG. 11. A biasing force is applied to the counter punch 31 in the downward movement thereof so as to urge the counter punch 31 to the initial position thereof.

In the provisional blanking of the strip W by the punch 9, the penetration depth (L) can be varied freely as long as the connecting pieces 79 can be formed. If desired, the penetration depth (L) may be a negative value. The connecting portion between the strip W and the provisionally blanked iron core laminate 2 consisted of a plurality of connecting pieces 79 in this case, but may also be of a configuration where the entire outer periphery of the iron core laminate 2 is connected to the strip W (or the inner periphery of the opening from which the iron core laminate 2 is provisionally blanked).

FIG. 12(C) shows the punch 9 which has moved upward from the state shown in FIG. 12(B) following the provisional blanking of the iron core laminate 2, and the iron core laminate 2 which was provisionally blanked into the die 19 as shown in FIG. 12(B) is pushed out from the die 19 under the pressure from the counter punch 31 (the spring 71) and the lifter pin 77 (the spring 76). As the free end 9a of the punch 9 rises into the through hole 13a of the stripper plate 13, the punch 9 is separated from the strip W (or from the hole from which the iron core laminate 2 is provisionally blanked).

In the progressive die machine 1 of the second embodiment, because the connecting pieces 79 connected to the strip W are formed along the outer periphery of the iron core laminate 2, and the stripper plate 13 is not in contact with the strip W at least at the time of the provisional blanking (or as far as the part associated with the provisional blanking is concerned), the provisionally blanked iron core laminate 2 is prevented from being pushed back to the strip W by the counter punch 31 (the provisionally blanked iron core laminate 2 is prevented from being pressed upward by the counter punch 31 while the strip W is pressed downward by the stripper plate 13). As a result, the complete separation of the iron core laminate 2 from the strip W at the time of provisional blanking can be avoided (the iron core laminate 2 is kept connected to the strip W), and the displacement of the pilot holes P situated adjacent to the iron core laminate 2 can be prevented from being displaced at the same time. Therefore, in the progressive die machine 1 of the second embodiment, the tolerance of the positional precision of each pilot hole P with respect to an associated pilot pin (not shown in the drawings) is not required to be unduly increased so as to accommodate a displacement of the pilot hole P. Therefore, the precision of the blanking operation is prevented from being impaired owing to an increase in the positional tolerance.

FIGS. 13(A) and 13(B) illustrate the mode of operation in a step (idle step) following the provisional blanking step. FIG. 13(A) shows the state of the strip W in the idle step at the same timing as FIG. 12(A). In a region (the idle stage) corresponding to the idle step, a recess 81 is formed on the upper surface 21a of the die plate 21 opposing the lower surface of the strip W. The recess 81 is configured and dimensioned to receive the iron core laminate 2 that projects downward from the lower surface of the strip W as a result of the provisional blanking step shown in FIG. 12(A). In this case, the recess 81 is substantially circular in shape having a size (diameter) greater than that of the iron core laminate 2 in plan view, and has a greater depth than the length (L+t) given as a sum of the penetration depth (L) of the punch 9 at the lower limit position mentioned above into the die 19 and the thickness (t) of the iron core laminate 2.

FIG. 13(B) shows the state of the strip W in the idle step at the same timing as FIG. 12(B). As the punch 9 moves downward as shown in FIG. 12(B), the strip W (including the iron core laminate 2 blanked in the provisional blanking step) in the idle step moves downward until the bottom surface of the strip W comes into contact with the upper surface 21a of the die plate 21.

At this time, because the iron core laminate 2 (in the provisionally blanked state) projecting downward from the strip W is received in the recess 81 as shown in FIG. 13(B), the iron core laminate 2 is prevented from being pushed against the upper surface 21a of the die plate 21 in the idle step so that the iron core laminate 2 is prevented from being pushed back to the strip W. In this case, the machine is configured such that the stripper plate 13 does not move downward, but this recess 81 is particularly useful if the stripper plate 13 moves downward in the idle step so that the strip W is clamped between the stripper plate 13 and the counter punch 31 or the die plate 21 (die 19) as is the case with the third embodiment which will be described hereinafter.

The counter punch 31 was pressed upward (toward the upper die assembly) by the biasing force of the spring 71, but a similar action of the counter punch 31 can be realized by using a support unit 32 and a vertical drive motor 33 similar to those used in the first embodiment, instead of the spring 71. Alternatively, a per se known hydraulic or pneumatic cylinder may be used for causing the vertical movement of the counter punch 31, instead of the spring 71.

Modification of the Second Embodiment

Figure 14:
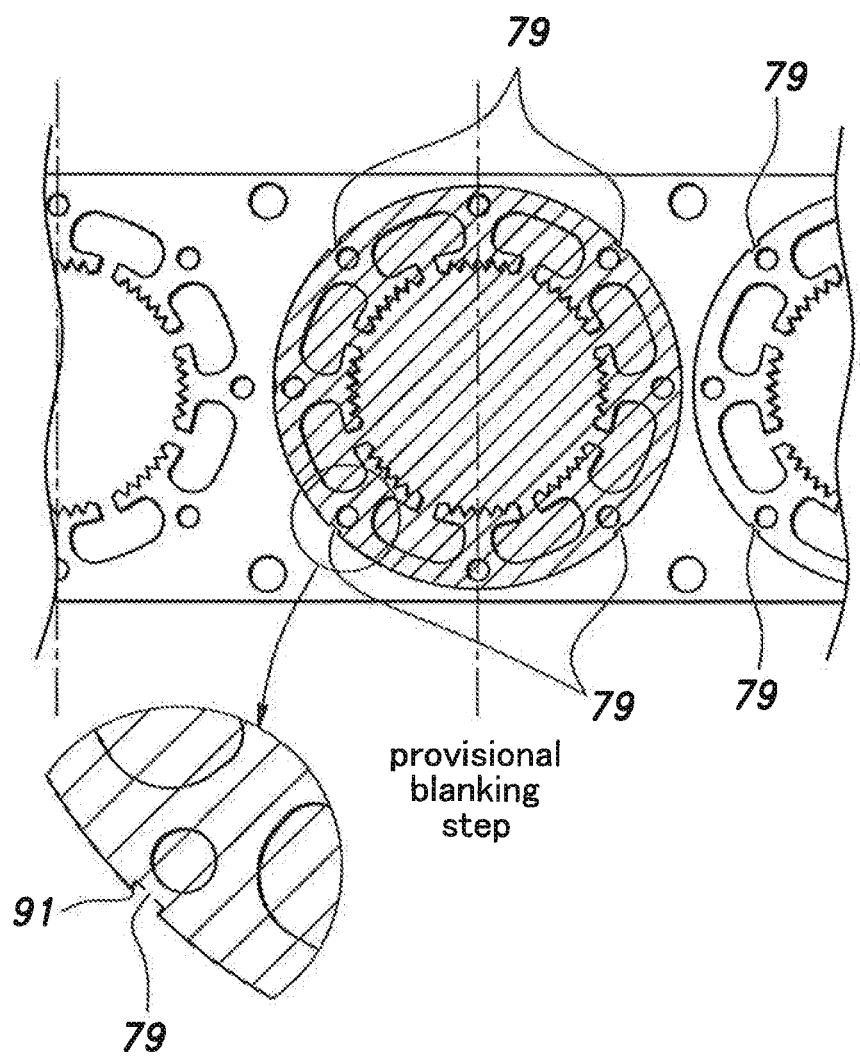
FIG. 14 is a view showing the strip layout of a progressive die machine of an embodiment modified from the second embodiment.

FIG. 14 shows a strip layout of a progressive die machine which is modified from that of the second embodiment. In FIG. 14, the parts corresponding to those shown in FIG. 11 (the second embodiment) are denoted with like numerals. This modified embodiment is similar to the second embodiment except for the matters that will be discussed in the following.

In the provisional blanking step of this modified embodiment, the outer periphery of the provisionally blanked iron core laminate 2 is formed with a plurality of notches 91, and a connecting piece 79 is formed inside each of the notches 91 (in the inner end of the notch 91 in this case). Therefore, even when burr or shear drop is produced in the sheared edges of the connecting pieces 79 by the punch 10 for the full blanking, the sheared edges are confined within the respective notches 91 on the outer periphery of the iron core laminate 2 so that the outer profile of the iron core laminate 2 is prevented frond being affected by such burr or shear drop in the sheared edges.

Third Embodiment

Figure 15:
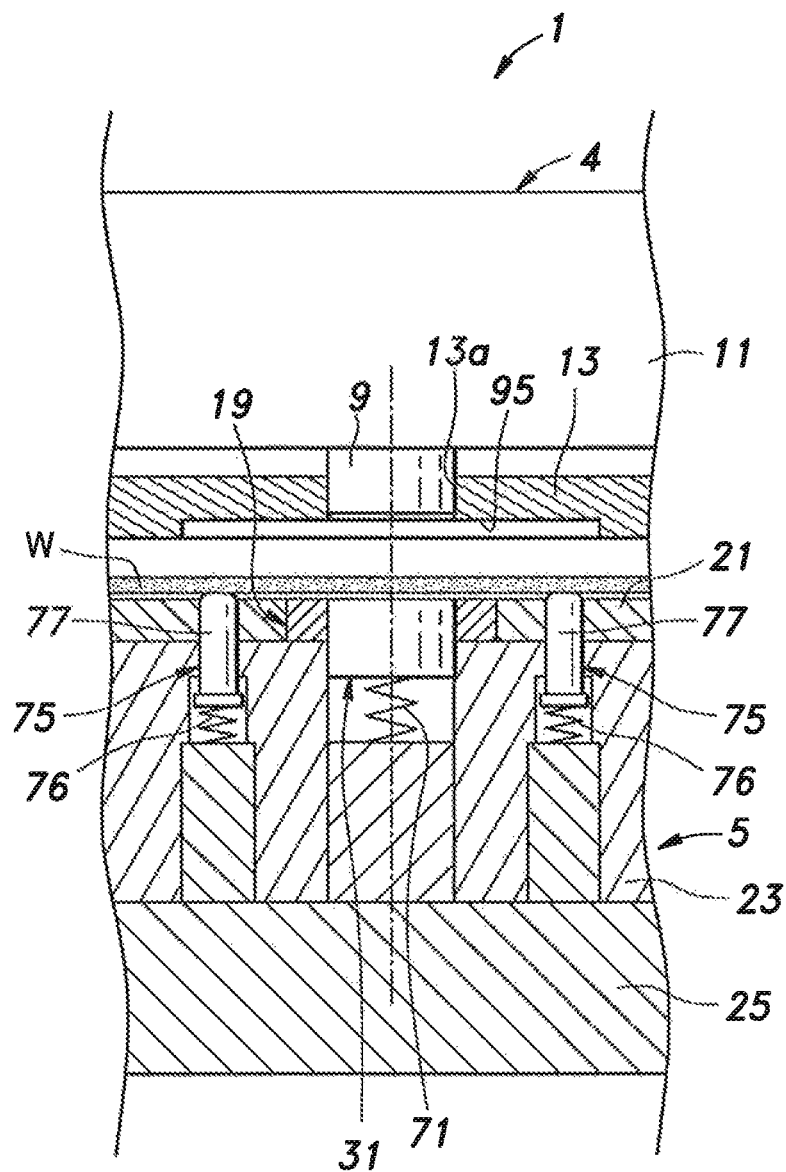
FIG. 15 is a view showing a main part of a progressive die machine equipped with an inverted pressing device of a third embodiment of the present invention.

FIG. 15 is a view showing a main part of a progressive die machine equipped with an inverted pressing device of a third embodiment of the present invention, and FIG. 16 is a bottom view of a stripper plate of the third embodiment. FIGS. 17(A) to 17(C) are views showing a series of actions in the provisional blanking step. In FIGS. 15 to 17, the parts corresponding to those shown in FIGS. 10 and 12 (the second embodiment) are denoted with like numerals. The third embodiment is similar to the second embodiment except for the matters that will be discussed in the following.

As shown in FIGS. 15 and 16, in the third embodiment, a recess 95 is formed in a part of the lower surface of the stripper plate 13 surrounding the opening of the hole 13a for passing through the punch 9. The recess 95 is substantially rectangular in shape, and is recessed upward across the width of the stripper plate 13 (in the direction orthogonal to the conveying direction of the strip W). The dimension of the recess in the conveying direction of the strip W is greater than the outer diameter of the punch 9. As will be discussed hereinafter, in the third embodiment, the stripper plate 14 moves downward with the punch 9 similarly as in the first embodiment.

FIG. 17(A) shows the punch 9 in the initial position of the vertical movement so that the free end 9a of the punch 9 is at the upper limit position. The upper surface 31a of the counter punch 31 is at the initial position which is (substantially) at the same height as the upper end surface 19a of the die 19.

In FIG. 17(B), similarly as in FIG. 12(B) discussed above, the punch 9 has provisionally blanked the strip W so that the free end 9a of the punch 9 is at the lower limit position. The counter punch 31 moves downward from the position shown in FIG. 17(A) owing to the compression of the spring 71 under the pressure from the punch 9. Similarly, the lifter pins 77 retract (moves downward) into the lower die assembly 5 (the die plate 21) owing to the compression of the springs 76 caused by the pressure of the punch 9 applied via the strip W and the pressure from the stripper plate 13. At this time, the stripper plate 13 moves downward with the punch 9 similarly as in the first embodiment, and presses the upper surface of the strip W downward against the die 19 and the die plate 21.

FIG. 17(C) shows the punch 9 in an upward stroke from the state shown in FIG. 17(B) following the provisional blanking of the iron core laminate 2. As the stripper plate 13 is configured to move upward with some time delay relative to the upward movement of the punch 9, similarly as in FIG. 17(B), the stripper plate 13 still presses the upper surface of the strip W downward toward the die 19 and the die plate 21. At this time, the iron core laminate 2 which is provisionally blanked into the die 19 in FIG. 17(B) is pushed out of the die 19 into the recess 95 by the pressure from the counter punch 31 and the lifter pin 77. As the free end of the punch 9 moves into the hole 13a (the through hole) of the stripper plate 13, the strip W is separated from the punch 9.

As discussed above, in the third embodiment, owing to the presence of the recess 95 on the lower surface side of the stripper plate 13, the provisionally blanked iron core laminate 2 and a peripheral part thereof (an upper part) move into the recess 95. Therefore, at least a part of the stripper plate 13 associated with the provisional blanking operation does not contact the strip W (the iron core laminate 2 and the surrounding part) so that the iron core laminate 2 is prevented from being forcibly pressed upward by the counter punch 31 to be pushed back toward the strip W. In other words, in the third embodiment, owing to the recess 95 of the stripper plate 13, the provisionally blanked iron core laminate 2 and the peripheral part thereof are prevented from being clamped between the stripper plate 13 and the counter punch 31.

Although the present invention has been described in terms of preferred embodiments thereof, it is obvious to a person skilled in the art that various alterations and modifications are possible without departing from the scope of the present invention. The counter punch was driven by the motor (electric motor) in the first embodiment, but a hydraulic or pneumatic drive unit may also be used for vertically driving the counter punch. The support unit for supporting the counter punch is not necessarily provided with a ball screw, but may also use a rod that can be reciprocated by a drive unit. For instance, a drive rod of a piezoelectric actuator may be connected to the counter punch so that the vertical movement of the counter punch may be effected by the expansion and compression of the piezoelectric actuator. The present invention can be applied not only to a die machine for blanking an iron core laminate for a laminated iron core but also to a die machine that is configured to blank any sheet (component parts) from a strip of material. The upper die assembly and the lower die assembly are not necessarily positioned one above the other, but may also be arranged in different ways. The various components of the progressive die machine and the method of manufacturing iron cores by using such a progressive die machine which were described in terms of specific embodiments are not entirely essential for the present invention, but may be freely substituted and omitted without departing from the spirit of the present invention.

Glossary of Terms

1 progressive die machine
2 iron core laminate (lamination sheet)
3 laminated iron core
4 upper die assembly
5 lower die assembly
6 inverted pressing device
9 punch (for provisional blanking)
10 punch
13 stripper plate
13a hole (through hole)
16 crankshaft
19 die
19a upper end surface (of die)
20 die
21 die plate
31 counter punch
31a upper surface (of counter punch)
32 support unit
33 vertical drive motor (drive unit)
34 controller (control unit)
35 driver
41 support shaft
42 ball screw
43 nut
44 screw rod
51 encoder
55 force sensor
72 punch (for pilot hole)
73 die
75 lifter
76 spring
77 lifter pin
79 connecting piece (connecting portion)
81 recess
91 notch
95 recess
P pilot hole
W strip (sheet material)

The invention claimed is:

1. A progressive die machine including an upper die assembly provided with a plurality of punches for blanking lamination sheets into a prescribed shape from a strip of sheet material that is conveyed in an intermittent manner and a lower die assembly provided with dies for cooperating with the plurality of punches, the progressive die machine comprising:
    a pilot hole punch of the plurality of punches for punching a pilot hole in the strip for a positioning of the strip;
    a provisional blanking punch of the plurality of punches for provisionally blanking each lamination sheet from the strip formed with the pilot hole without completely separating the lamination sheet from the strip;
    a counter punch provided in the lower die assembly and configured to press the lamination sheet against the provisional blanking punch when provisionally blanking the lamination sheet;
    a stripper plate for separating the strip from the provisional blanking punch after provisionally blanking the lamination sheet, the stripper plate defining a through hole receiving the provisional blanking punch for reciprocating movement therein, the stripper plate including a surface having a first portion configured to contact the strip and a second portion defining a recess surrounding the through hole such that the second portion does not contact a region of the strip forming an outer peripheral part of the lamination sheet; and
    a full blanking punch of the plurality of punches for completely separating the lamination sheet that has been provisionally blanked from the strip;
    wherein at least a part of the outer peripheral part of the provisionally blanked lamination sheet is formed with a connecting portion connected to the strip, and wherein the recess is configured so that the provisionally blanked lamination sheet and an inner peripheral part of the strip surrounding the provisionally blanked lamination sheet move into the recess.

2. The progressive die machine according to claim 1, wherein the counter punch is always biased toward a side of the provisional blanking punch.

3. The progressive die machine according to claim 1, further comprising an idle stage in a downstream part of the provisional blanking punch, wherein a surface of the lower die assembly facing the strip in the idle stage is formed with a recess for receiving the provisionally blanked lamination sheet.

4. The progressive die machine according to claim 1, wherein the connecting portion is connected to the lamination sheet inside a notch formed on an outer periphery of the lamination sheet.

5. A method for manufacturing a laminated iron core by using a progressive die machine including an upper die assembly provided with a plurality of punches for blanking lamination sheets from a strip of sheet material that is conveyed in an intermittent manner and a lower die assembly provided with dies for cooperating with the punches, the method comprising the steps of:

punching a pilot hole in the strip for a positioning of the strip;

provisionally blanking each lamination sheet from the strip formed with the pilot hole without completely separating the lamination sheet from the strip;

pressing the lamination sheet in a direction inverted from that for provisionally blanking the lamination sheet when provisionally blanking the lamination sheet;

separating the strip from a punch for provisionally blanking the lamination sheet by using a stripper plate after the lamination sheet is provisionally blanked, the stripper plate defining a through hole receiving a provisional blanking punch pf the plurality of punches for reciprocating movement therein, the stripper plate including a surface having a first portion that contacts the strip and a second portion defining a recess surrounding the through hole such that the second portion does not contact a region of the strip forming an outer peripheral part of the lamination sheet; and fully blanking the lamination sheet that has been provisionally blanked so as to completely separate the lamination sheet from the strip;

wherein at least a part of an outer periphery of each lamination sheet is formed with a connecting portion connected to the strip after being provisionally blanked, and wherein the recess is configured so that the provisionally blanked lamination sheet and an inner peripheral part of the strip surrounding the provisionally blanked lamination sheet move into the recess.

6. The progressive die machine according to claim 2, wherein the counter punch is always biased toward a side of the provisional blanking punch by a spring.

7. The progressive die machine according to claim 1, wherein the counter punch is biased toward a side of the provisional blanking punch by a hydraulic or pneumatic drive under control of a control unit.

8. The progressive die machine according to claim 1, wherein the counter punch is biased toward a side of the provisional blanking punch by a vertical drive motor having an output shaft and a ball screw mechanism having a screw rod which is directly connected to the output shaft under control of a control unit.

9. The progressive die machine according to claim 1, wherein the provisional blanking is performed as a half blanking operation.

10. The progressive die machine according to claim 1, wherein the provisional blanking is performed as a combination of full blanking and incomplete pushback.

11. The progressive die machine according to claim 1, wherein the connecting portion includes a plurality of connecting pieces spaced apart from each other in a circumferential direction between the provisionally blanked lamination sheet and the strip of sheet material.

* * * * *